US012329249B2

(12) United States Patent
Kim et al.

(10) Patent No.: US 12,329,249 B2
(45) Date of Patent: Jun. 17, 2025

(54) STRAP AND WEARABLE ELECTRONIC DEVICE INCLUDING THE SAME

(71) Applicant: Samsung Electronics Co., Ltd., Gyeonggi-do (KR)

(72) Inventors: Jinwook Kim, Gyeonggi-do (KR); Juan Lee, Gyeonggi-do (KR); Insik Chung, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 353 days.

(21) Appl. No.: 17/882,668

(22) Filed: Aug. 8, 2022

(65) Prior Publication Data
US 2023/0019765 A1    Jan. 19, 2023

Related U.S. Application Data

(63) Continuation of application No. PCT/KR2022/009543, filed on Jul. 1, 2022.

(30) Foreign Application Priority Data

Jul. 15, 2021  (KR) .......................... 10-2021-0093107
Jan. 28, 2022  (KR) .......................... 10-2022-0013720

(51) Int. Cl.
*A44C 5/14*      (2006.01)
*G04B 37/14*    (2006.01)
*G04B 37/16*    (2006.01)

(52) U.S. Cl.
CPC ................ *A44C 5/14* (2013.01); *A44C 5/145* (2013.01); *G04B 37/1486* (2013.01); *G04B 37/16* (2013.01)

(58) Field of Classification Search
CPC ...... A44C 5/14; A44C 5/145; G04B 37/1486; G04B 37/16
See application file for complete search history.

(56) References Cited

U.S. PATENT DOCUMENTS 3,889,323 A * 6/1975 Reith ....................... A44C 5/14
                                                                 224/177
4,414,719 A * 11/1983 Capolupo ................ A44C 5/14
                                                                 24/615
(Continued)

FOREIGN PATENT DOCUMENTS

CN    212781706 U       3/2021
EP        3470935 A1 *  4/2019    ......... G04B 37/1486
(Continued)

OTHER PUBLICATIONS

Partial machine translation of EP-3470935-A1 (Year: 2024).*
International Search Report dated Oct. 4, 2022.
Extended European Search Report dated Sep. 18, 2024.

*Primary Examiner* — Edwin A. Leon
*Assistant Examiner* — Sean R Brannon
(74) *Attorney, Agent, or Firm* — Cha & Reiter, LLC

(57) ABSTRACT

A wearable electronic device, and strap for the same are disclosed. The wearable electronic device includes: a housing, including a first connection pin detachably inserted in a first direction and a second connection pin detachably inserted in a second direction opposite to the first direction, a first strap detachably affixed to the housing via the first connection pin, and a second strap detachably affixed to the housing via the second connection pin, wherein the first strap includes a body member including a seated part in which an insert member is accommodated, and a clip member coupled to the insert member, the clip member defining an opening therein that extends lengthwise, and wherein the clip member is rotatably combined with the first connection pin.

20 Claims, 21 Drawing Sheets

(56) References Cited

U.S. PATENT DOCUMENTS

| | | |
|---|---|---|
| 9,756,907 B2 | 9/2017 | Frei |
| 9,839,264 B2 | 12/2017 | Schooley et al. |
| 2007/0070823 A1 | 3/2007 | Sima |
| 2016/0004222 A1* | 1/2016 | Barnes ............... G04B 37/1493 |
| | | 368/281 |
| 2016/0037897 A1 | 2/2016 | Bataillou et al. |
| 2016/0058375 A1* | 3/2016 | Rothkopf ................ G06F 1/163 |
| | | 600/323 |
| 2017/0265607 A1 | 9/2017 | Hatanaka et al. |
| 2019/0064744 A1 | 2/2019 | Nicolas et al. |
| 2020/0142358 A1 | 5/2020 | Taniguchi et al. |
| 2020/0315304 A1 | 10/2020 | Humbert |
| 2021/0059362 A1 | 3/2021 | Xue |
| 2021/0255586 A1 | 8/2021 | Loetscher |

FOREIGN PATENT DOCUMENTS

| | | |
|---|---|---|
| EP | 3617812 A1 | 3/2020 |
| JP | 61-51015 U | 4/1986 |
| JP | 3023849 U | 2/1996 |
| JP | 2019-37771 A | 3/2019 |
| JP | 2019-122794 A | 7/2019 |
| KR | 10-2018-0088172 A | 8/2018 |

* cited by examiner

STRAP AND WEARABLE ELECTRONIC DEVICE INCLUDING THE SAME

CROSS-REFERENCE TO RELATED APPLICATION(S)

This application is a continuation of International Application No. PCT/KR2022/009543, which was filed on Jul. 1, 2022, and claims priority to Korean Patent Application No. 10-2021-0093107, filed on Jul. 15, 2021, and 10-2022-0013720 filed on Jan. 28, 2022, in the Korean Intellectual Property Office, the disclosures of which are incorporated by reference herein their entirety.

TECHNICAL FIELD

Certain embodiments of the disclosure relate to a wearable electronic device, and more particularly, to configurations of a strap and wearable electronic device for facilitating charging.

BACKGROUND

Recent times have seen an increase in popularity of wearable electronic devices. Wearable electronic devices are generally wearable on the body (e.g., wrist or ankle) of a user. They are able to provide various functions to the user and/or to other communicably coupled devices.

The wearable electronic device may include at least one strap, which may be coupled to the body of a user.

The wearable electronic device may be secured to the body of a user, or may be detached from the body of the user by using the at least one strap.

The wearable electronic device may permit charging of a battery, through usage of a wired and/or wireless charger.

A wearable electronic device may include a wireless charging part (e.g., a wireless charging coil) within a housing.

The wearable electronic device may wirelessly receive charging power from another electronic device, such as a smartphone or a wireless charger, through the wireless charging part.

In the wearable electronic device, charging may be performed poorly or abnormally if at least one strap attached to a part of the housing is not horizontally unfolded, and if electrical isolation is not maintained between the housing including the wireless charging part from another electronic device (e.g., a wireless charger).

Furthermore, if the housing of the wearable electronic device and the strap are combined using a connection pin including a spring, for example, the strap may require separation from the connection pin using a separate tool to allow proper charging of the wearable electronic device, which is inconvenient.

SUMMARY

Certain embodiments of the disclosure provide a strap capable of detachable combination with a connection pin of a housing, and further capable of being horizontally unfolded with respect to the housing, to facilitate both wearability and wireless charging.

Technical objects to be achieved in the disclosure are not limited to the aforementioned technical objects, and other technical objects not described above may be evidently understood by a person having ordinary knowledge in the art to which the disclosure pertains from the following description.

A wearable electronic device according to certain embodiments of the disclosure includes a housing, including a first connection pin detachably inserted in a first direction and a second connection pin detachably inserted in a second direction opposite to the first direction, a first strap detachably affixed to the housing via the first connection pin, a second strap detachably affixed to the housing via the second connection pin, wherein the first strap includes: a body member including a seated part in which an insert member is accommodated, a clip member coupled to the insert member, the clip member defining an opening therein that extends lengthwise, and wherein the clip member is rotatably combined with the first connection pin.

A strap according to certain embodiments of the disclosure includes a body member including a seated part, an insert member accommodated within the seated part, and a clip member coupled to the insert member and defining an opening therein that extends lengthwise.

According to certain embodiments of the disclosure, the wearable electronic device includes a conveniently detachable connection pin in the housing thereof, which facilitates convenient and rapidly charging, insofar as the detachment of the pin permits easy horizontal unfolding of the strap with respect to the housing during wireless charging.

In addition, various effects directly or indirectly understood through this document may be provided.

DETAILED DESCRIPTION

In relation to the description of the drawings, the same or similar reference numerals may be used with respect to the same or similar constituent elements, in which in which.

DETAILED DESCRIPTION

Figure 1:
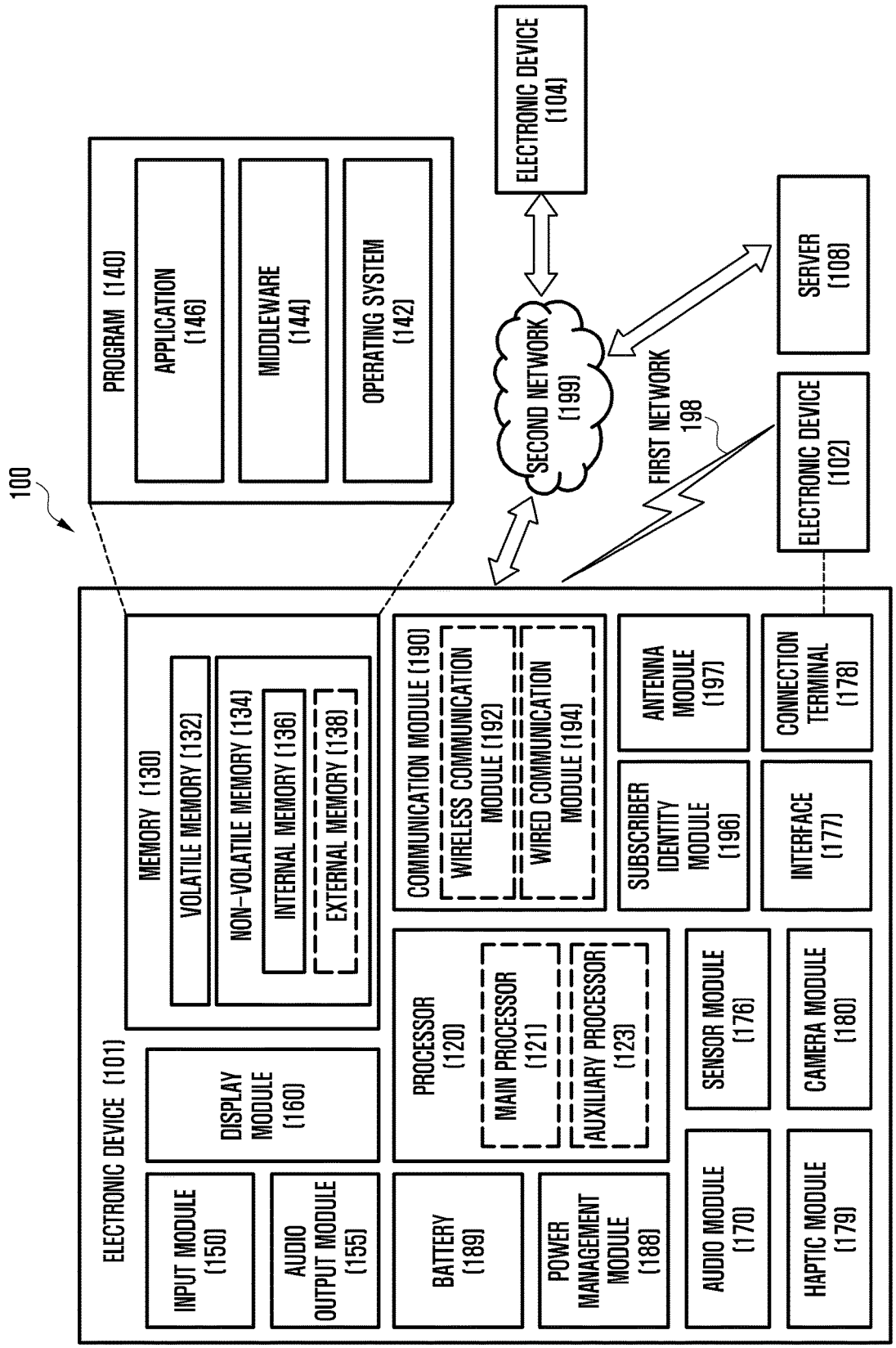
FIG. 1 is a block diagram of an electronic device within a network environment according to certain embodiments of the disclosure.

FIG. 1 is a block diagram of an electronic device within a network environment according to certain embodiments of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may esupport a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 2A:
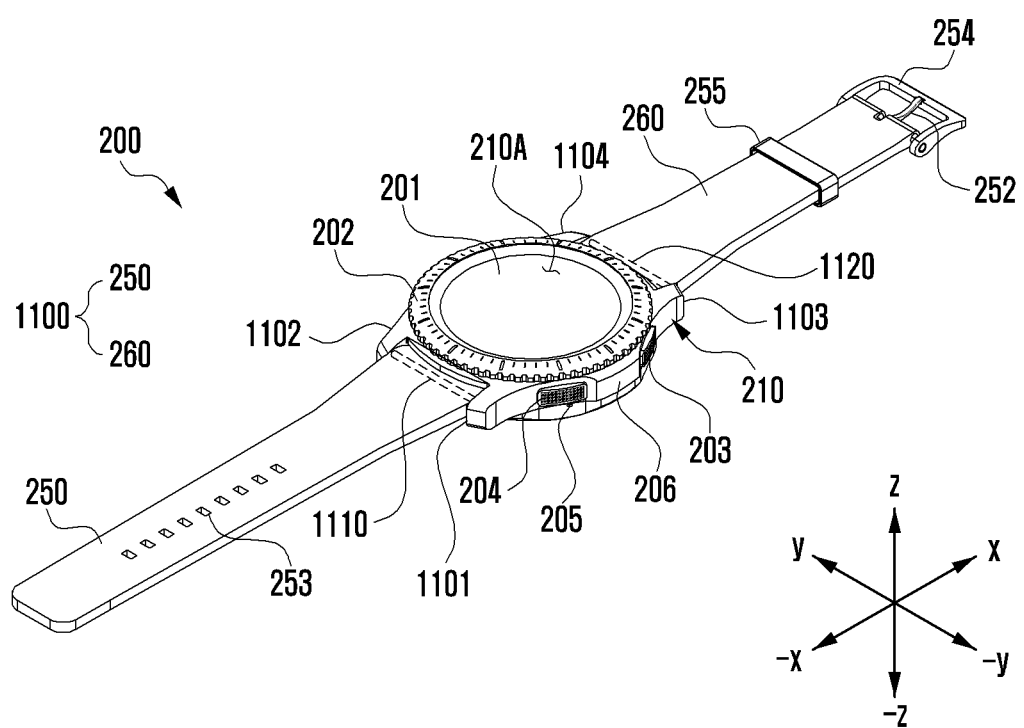
FIG. 2A is a perspective view schematically illustrating a front surface of the wearable electronic device according to an embodiment of the disclosure.
Figure 2B:
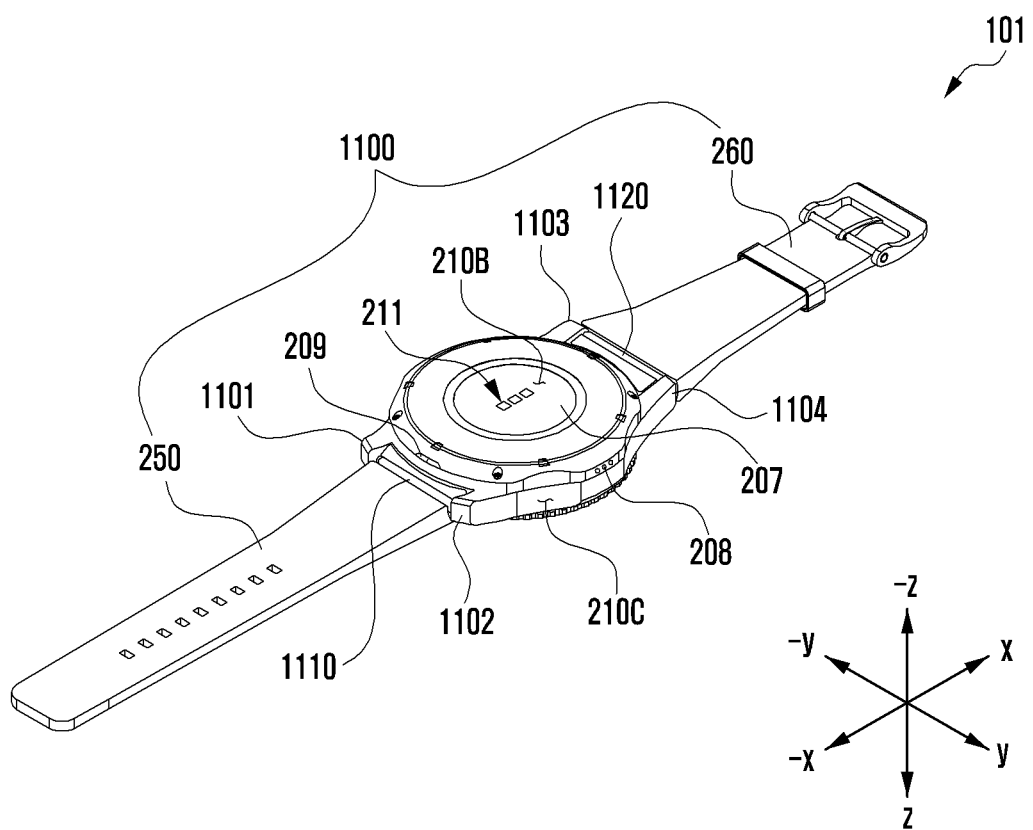
FIG. 2B is a perspective view schematically illustrating a back surface of the wearable electronic device disclosed in FIG. 2A.

FIG. 2A is a perspective view schematically illustrating a front surface of the wearable electronic device according to an embodiment of the disclosure. FIG. 2B is a perspective view schematically illustrating a back surface of the wearable electronic device disclosed in FIG. 2A.

With reference to FIGS. 2A and 2B, a wearable electronic device 200 according to an embodiment of the disclosure may include a housing 210, including a first surface (or the front surface) 210A directed toward a first direction (e.g., a z axis direction), a second surface (or the back surface) 210B directed toward a second direction (e.g., a −z axis direction), that is, a direction opposite to the first direction, and a side surface 210C surrounding a space between the first surface 210A and the second surface 210B, and a strap 1100 connected to at least a part of the housing 210 and arranged to detachably settle the wearable electronic device 200 in a part (e.g., a wrist or an ankle) of the body of a user.

According to an embodiment, the strap 1100 may include a first strap 250 (e.g., a first settlement member) and a second strap 260 (e.g., a second settlement member).

According to an embodiment, the housing 210 may include a first part 1101 protruding toward one direction (e.g., a −x axis direction) and formed at a first location (e.g., a −y axis direction), a second part 1102 protruding toward one direction (e.g., the −x axis direction) and formed at a second location (e.g., a y axis direction), a third part 1103 protruding toward a direction (e.g., an x axis direction) opposite to the one direction (e.g., the −x axis direction) and formed at a third location (e.g., the −y axis direction), and a fourth part 1104 protruding toward a direction (e.g., the x axis direction) opposite to the one direction (e.g., the −x axis direction) and formed at a fourth location (e.g., the y axis direction), for example. In an embodiment, a combination groove 1105 disclosed in FIG. 3 may be formed in each of the inside of each of the first part 1101 and the second part 1102 and the inside of each of the third part 1103 and the fourth part 1104, for example.

According to an embodiment, a first connection pin 1110 may be disposed between the first part 1101 and the second part 1102. For example, the first connection pin 1110 may be combined (e.g., as used herein, combined is may indicate coupled, such as in a mechanical fashion) with the first part 1101 and the second part 1102, as a first end and second end of the first connection pin 1110 are inserted into the combination grooves 1105 formed in the interiors of the first part 1101 and the second part 1102, respectively. The first strap 250 may be detachably combined with the first connection pin 1110.

According to an embodiment, a second connection pin 1120 may be disposed between the third part 1103 and the fourth part 1104. For example, the second connection pin 1120 may be combined (e.g., coupled) with the third part 1103 and the fourth part 1104, as a first end and second end of the second connection pin 1120 are inserted into the combination grooves 1105 formed in the interiors of the third part 1103 and the fourth part 1104, respectively. The second strap 260 may be detachably coupled with the second connection pin 1120.

In another embodiment (not illustrated), the housing 210 may also include a structure forming some of the first surface 210A, the second surface 210B, and the side surface 210C in FIG. 2A. According to an embodiment, the first surface 210A may be formed by a front surface plate 201 (e.g., a glass plate or polymer plate including various coating layers) at least a part of which is substantially transparent. The second surface 210B may be formed by a back surface plate 207 that is substantially opaque. The back surface plate 207 may be formed by coated or colored glass, ceramic, polymer, metal (e.g., aluminum, stainless steel (STS), or magnesium), or a combination of at least two of the materials, for example. The side surface 210C may be combined with the front surface plate 201 and the back surface plate 207, and may be formed by a side surface bezel structure (or a side surface member) 206 including metal and/or polymer.

In an embodiment, the back surface plate 207 and the side surface bezel structure 206 may be integratedly formed, and may include the same material (e.g., a metal material such as aluminum).

According to an embodiment, the strap 1100 (e.g., the first strap 250 and the second strap 260) may be formed by using various materials in various forms. For example, each of the first strap 250 and the second strap 260 may be formed in an integrated manner so that a plurality of unit links is movable with respect to one another by fabric, leather, rubber, urethane, metal, ceramic, silicon, fluoro-elastomers, plastic or a combination of at least two of the materials.

According to an embodiment, the wearable electronic device 200 may include at least one of a display 220 (refer to FIG. 3), an audio module 205 and 208, a sensor module 211, a key input device 202, 203, and 204, and a connector hole 209. In an embodiment, the wearable electronic device 200 may omit at least one of the listed elements (e.g., the key input device 202, 203, and 204, the connector hole 209, or the sensor module 211) or may additionally include another element.

According to an embodiment, a display (e.g., the display 220 in FIG. 3) may be exposed through a part of the front surface plate 201, for example. A form of the display 220 may be a form corresponding to a form of the front surface plate 201, and may be various forms, such as a circle, an oval shape, or a polygon. The display 220 may be combined with a touch detection circuit, a pressure sensor and/or a fingerprint sensor capable of measuring the intensity (pressure) of a touch or may be disposed adjacent thereto.

According to an embodiment, the audio module 205 and 208 may include a microphone hole 205 and a speaker hole 208. The microphone hole 205 may have disposed therein a microphone for receiving an external sound and transforming the same into an electrical signal. In an embodiment, a plurality of microphones may be disposed so as to be capable of detecting a direction from which a sound originates. The speaker hole 208 may be used as an external speaker or a receiver for a call. In an embodiment, the speaker hole 208 and the microphone hole 205 may be implemented as one hole, or the audio module may include a speaker (e.g., a piezo speaker) without the speaker hole 208.

According to an embodiment, the sensor module 211 may generate an electric signal or a data value corresponding to an operating state within the electronic device 200 or an external environment state. The sensor module 211 may include a bio sensor module 211 (e.g., an HRM sensor) disposed in the second surface 210B of the housing 210, for example. The electronic device 200 may further include at least one of sensor modules not illustrated, for example, a gesture sensor, a gyro sensor, an atmospheric sensor, a magnetic sensor, an acceleration sensor, a grip sensor, a color sensor, an infrared (IR) sensor, a bio sensor, a temperature sensor, a humidity sensor, or an illuminance sensor.

According to an embodiment, the key input device 202, 203, and 204 may include a wheel key 202 disposed on the first surface 210A of the housing 210 and rotatable in at least one direction and/or a side key button 203 and 204 disposed on the side surface 210C of the housing 210. The wheel key 202 may have a form corresponding to a form of the front surface plate 201. In another embodiment, the wearable electronic device 200 may not include some or all of the aforementioned key input devices 202, 203, and 204. The key input devices 202, 203, and 204 not included in the wearable electronic device 200 may be implemented in another form, such as a soft key, on the display 220. The connector hole 209 may include another connector hole (not illustrated) capable of accommodating a connector (e.g., a USB connector) for transmitting and receiving power and/or data to and from an external electronic device and accommodating a connector for transmitting and receiving audio signals to and from an external electronic device. The wearable electronic device 200 may further include a connector cover (not illustrated) covering at least a part of the connector hole 209 and blocking the introduction of an alien substance into the connector hole, for example.

According to an embodiment, the first strap 250 may be detachably coupled by the first connection pin 1110 as arranged between the first part 1101 and second part 1102 of the housing 210. The second strap 260 may be detachably coupled by the second connection pin 1120 as arranged between the third part 1103 and fourth part 1104 of the housing 210.

According to an embodiment, the first strap 250 may include at least one fixing member fastening hole 253. The second strap 260 may include one or more of a fixing member 252, a band guide member 254, and a band fixing ring 255. In another embodiment (not illustrated), the first strap 250 may include one or more of the fixing member 252, the band guide member 254, and the band fixing ring 255, and the second strap 260 may include the at least one fixing member fastening hole 253.

According to an embodiment, the fixing member 252 may be disposed so as to secure the housing 210, and the first strap 250 and the second strap 260 to a part (e.g., a wrist or an ankle) of the body of a user. The at least one fixing member fastening hole 253 may secure the housing 210, and the first strap 250 and the second strap 260 to a part of the body of the user in accordance with the fixing member 252. The band guide member 254 is disposed so as to restrict the range of a movement of the fixing member 252 when the fixing member 252 is fastened to the fixing member fastening hole 253, so that the first strap 250 and the second strap 260 are closely coupled to and relative stable on the body of a user. The band fixing ring 255 may restrict the range of a movement of the first strap 250 and the second strap 260 in the state in which the fixing member 252 and the fixing member fastening hole 253 have been fastened.

Figure 3:
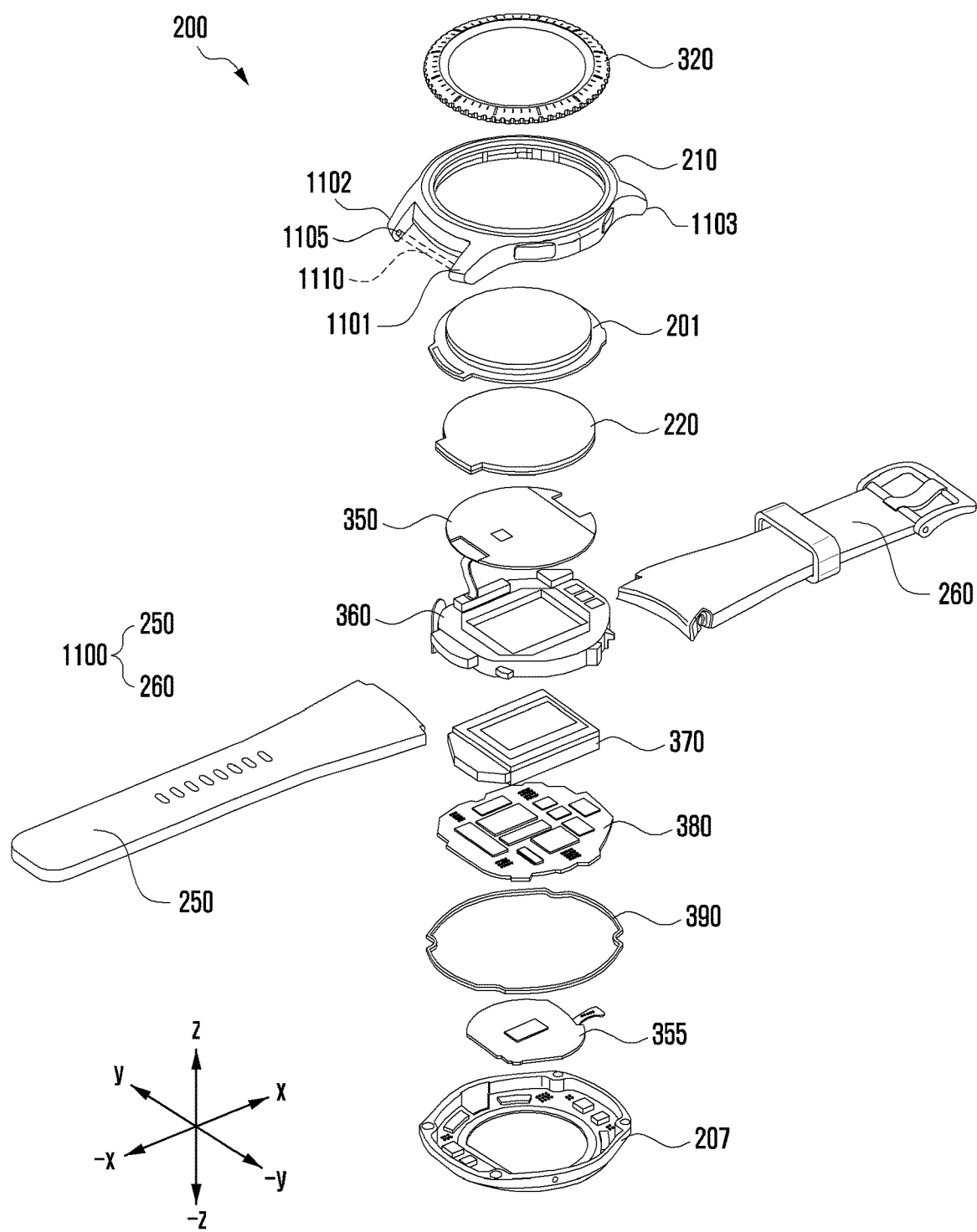
FIG. 3 is a diagram schematically illustrating an exploded perspective view of the wearable electronic device disclosed in FIG. 2A.

FIG. 3 is a diagram schematically illustrating an exploded perspective view of the wearable electronic device disclosed in FIG. 2A.

With reference to FIG. 3, the wearable electronic device 200 may include the housing 210 (e.g., a side surface bezel structure), a wheel key 320 (e.g., the wheel key 202 in FIG. 2A), the front surface plate 201, the display 220, a first antenna 350, a second antenna 355, a support member 360 (e.g., a bracket), a battery 370, a printed circuit board 380, a sealing member 390, the back surface plate 207 and/or the strap 1100 (e.g., the first strap 250 and the second strap 260). At least one of the aforementioned elements of the wearable electronic device 200 may be the same as or similar to at least one of the elements of the electronic device 101 in FIG. 1 and the wearable electronic device 200 in FIG. 2A and/or FIG. 2B, and a redundant description thereof is omitted hereinafter.

According to an embodiment, the support member 360 may be disposed within the wearable electronic device 200 and connected to the housing 210, or may be integratedly formed with the housing 210. The support member 360 may be formed using a metal material and/or non-metal (e.g., polymer) material, for example. One surface (e.g., the z axis direction) of the support member 360 may be combined with the display 220, and the other surface (e.g., a −z axis direction) thereof may be combined with the printed circuit board 380.

According to an embodiment, the processor 120, the memory 130 and/or the interface 177 disclosed in FIG. 1 may be mounted on the printed circuit board 380. The processor 120 may include one or more of a central processing unit, an application processor, a graphic processing unit (GPU), an application processor, a sensor processor, or a communication processor, for example. The memory 130 may include a volatile memory or a nonvolatile memory, for example. The interface 177 may include a high definition multimedia interface (HDMI), a universal serial bus (USB) interface, an SD card interface and/or an audio interface, for example. The interface may electrically or physically the wearable electronic device 200 to an external electronic device, for example, and may include a USB connector, an SD card/MMC connector, or an audio connector.

According to an embodiment, the battery 370 may supply power to at least one element of the wearable electronic device 200, and may include a primary cell incapable of recharging, a rechargeable secondary cell or fuel cell, for example. At least a part of the battery 370 may be disposed substantially on the same plane as the printed circuit board 380, for example. The battery 370 may be integratedly disposed within the electronic device 200, and may be disposed in a way to be attachable to or detachable from the wearable electronic device 200.

According to an embodiment, the first antenna 350 may be disposed between the display 220 and the support member 360. The first antenna 350 may include a near field communication (NFC) antenna, a wireless charging antenna and/or a magnetic secure transmission (MST) antenna, for example. The first antenna 350 may communicate with an external device through short-distance communication or may wirelessly transmit and receive power necessary for charging, for example, and may transmit a short-distance communication signal or a magnetic-based signal including payment data. In another embodiment, an antenna structure may be formed by some of the housing 210 and/or the support member 360 or a combination of them.

According to an embodiment, the second antenna 355 (e.g., a wireless charging coil) may be disposed between the printed circuit board 380 and the back surface plate 207. The second antenna 355 may include a near field communication (NFC) antenna, a wireless charging antenna and/or a magnetic secure transmission (MST) antenna, for example. The second antenna 355 may communicate with an external device through short-distance communication or may wirelessly transmit and receive power necessary for charging, for example, and may transmit a short-distance communication signal or a magnetic-based signal including payment data. In another embodiment, an antenna structure may be formed by some of the housing 210 and/or the back surface plate 207 or a combination of them.

According to an embodiment, the sealing member 390 may be disposed between the housing 210 and the back surface plate 207. The sealing member 390 may be disposed to block moisture and a foreign substance that are introduced from the outside to a space surrounded by the housing 210 and the back surface plate 207.

Figure 4:
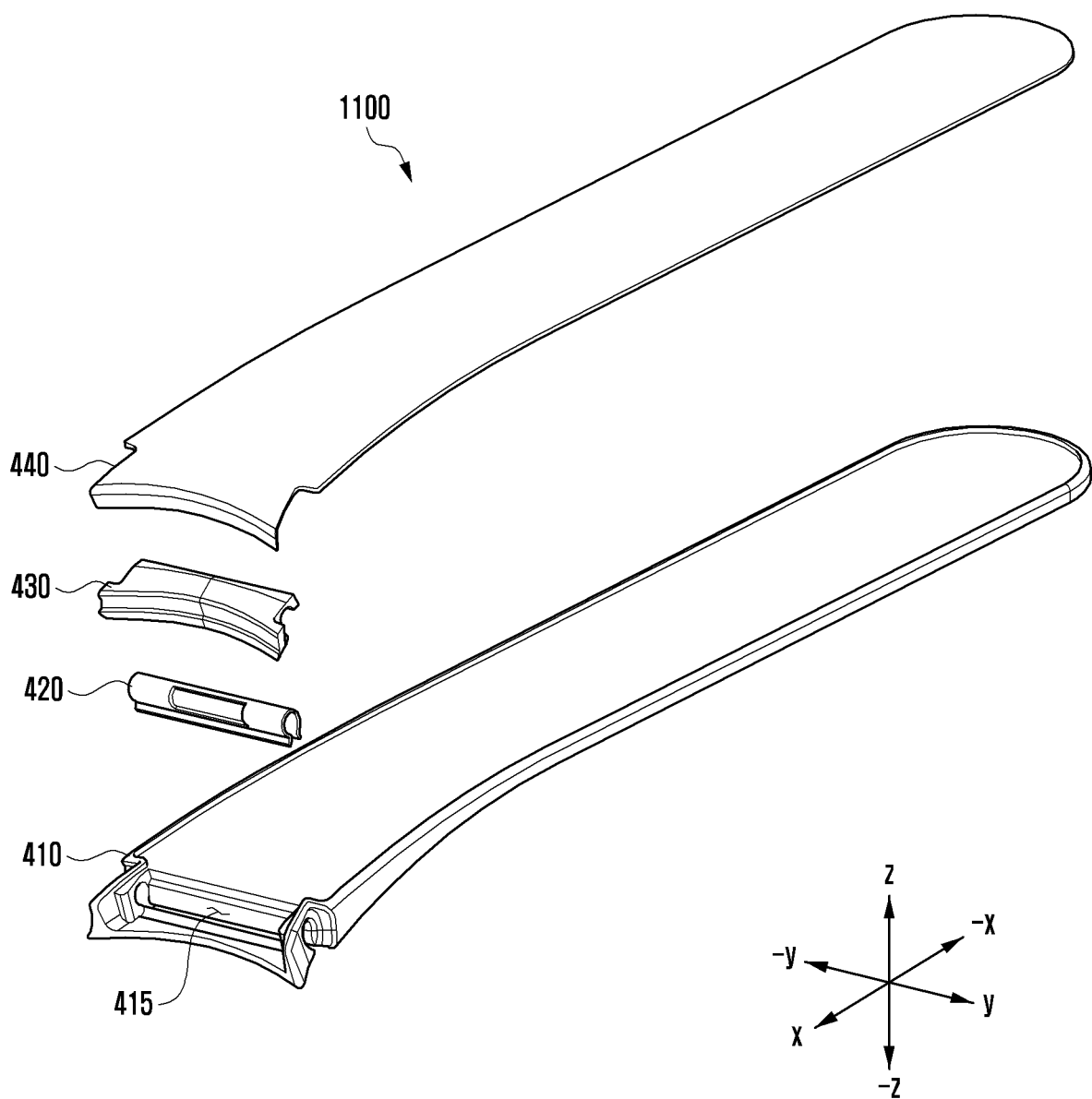
FIG. 4 is an exploded perspective view schematically illustrating an example a strap of the wearable electronic device according to certain embodiments of the disclosure.

FIG. 4 is an exploded perspective view schematically illustrating an example the strap of the wearable electronic device according to certain embodiments of the disclosure.

According to certain embodiments, the strap 1100 may include the first strap 250 and/or the second strap 260 as disclosed in FIGS. 2A to 3. The first strap 250 or the second strap 260 may have substantially the same design. In the description of the strap 1100 disclosed hereinafter, the first strap 250 has been described for use as an example, but the description may also be substantially identically applied to the second strap 260.

With reference to FIG. 4, the strap 1100 (e.g., the first strap 250 or the second strap 260) of the wearable electronic device 200 according to certain embodiments of the disclosure may include a body member 410, a clip member 420, an insert member 430 and/or an outer cover member 440.

According to certain embodiments, the outer cover member 440 of the elements of the wearable electronic device 200 may be omitted. The body member 410, the clip member 420, and the insert member 430 may be integratedly formed by using an insert injection method.

According to an embodiment, the body member 410 may form the body of the strap 1100. The body member 410 is a part surrounding a part (e.g., a wrist or an ankle) of the body of a user, and may be implemented using a flexible material. For example, the body member 410 may include a rubber, urethane, silicon or fluoro-elastomer material. One end (e.g., an x axis direction) of the body member 410 may include a seated part 415. The seated part 415 may accommodate and seat the clip member 420 and the insert member 430 therein. The seated part 415 may be formed in a groove form, and may support the clip member 420 and the insert member 430 inserted therein. In certain embodiments, since the clip member 420 is accommodated in the insert member 430 and the insert member 430 is accommodated in the seated part 415 of the body member 410, the seated part 415 may be formed in a shape corresponding to an outward form of the insert member 430.

According to an embodiment, the clip member 420 and the insert member 430 may be combined within the seated part 415 formed in one end (e.g., the x axis direction) of the body member 410. In certain embodiments, the body member 410, the clip member 420, and the insert member 430 may be integratedly formed by using an insert injection method According to an embodiment, the clip member 420 may include a substantially U shape having one direction (e.g., a −z axis direction) thereof opened. For example, one direction (e.g., the −z axis direction) of the clip member 420 may be open and an interior thereof may be shaped in a circular form so that the clip member 420 is assemblable with a connection pin (e.g., the first connection pin 1110 or the second connection pin 1120). The clip member 420 may include metal or a rigid plastic material. The clip member 420 may be rotatably coupled with the first connection pin 1110 (or the second connection pin 1120). The clip member 420 may surround a part of the first connection pin 1110 (or the second connection pin 1120).

According to an embodiment, the insert member 430 may accommodate at least a part of the clip member 420, and may be coupled within the seated part 415 of the body member 410. The insert member 430 may include substantially a U-shaped groove having one direction (e.g., the −z axis direction) opened, for example, so that the insert member 430 may be disposed so as to surround at least a part of the clip member 420. The insert member 430 may be implemented using a plastic material. At least a part of the clip member 420 may be inserted into the insert member 430. The insert member 430 may be accommodated in the seated part 415 of the body member 410.

According to an embodiment, the outer cover member 440 may be attached to an outer surface of the insert member 430, that is inserted into the seated part 415 and an outer surface (e.g., a z axis direction) of the body member 410. The outer cover member 440 may include leather or a fabric material.

Figure 5:
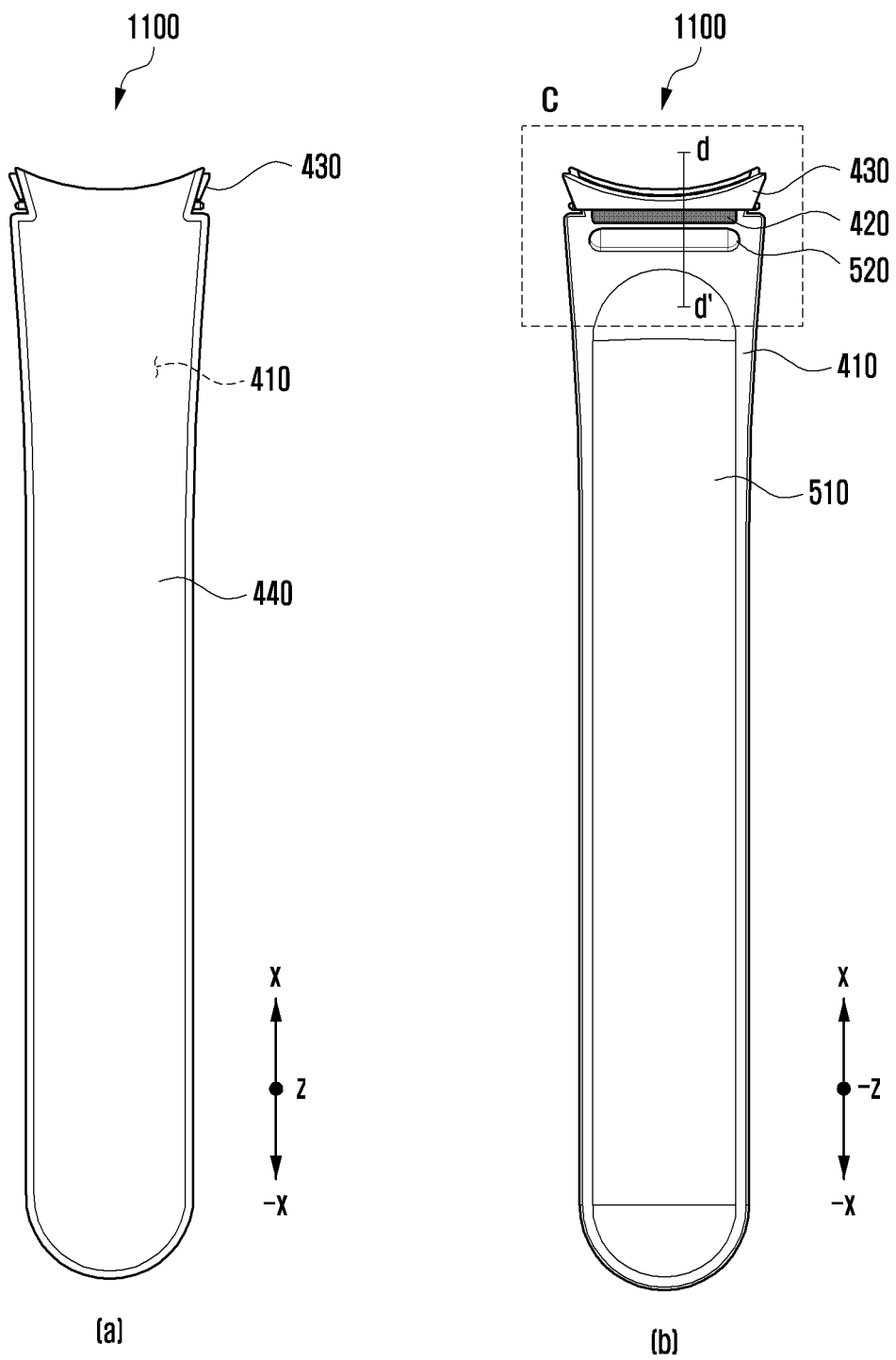
FIG. 5 is a diagram schematically illustrating a top surface and bottom surface of the strap according to certain embodiments of the disclosure.
Figure 6:
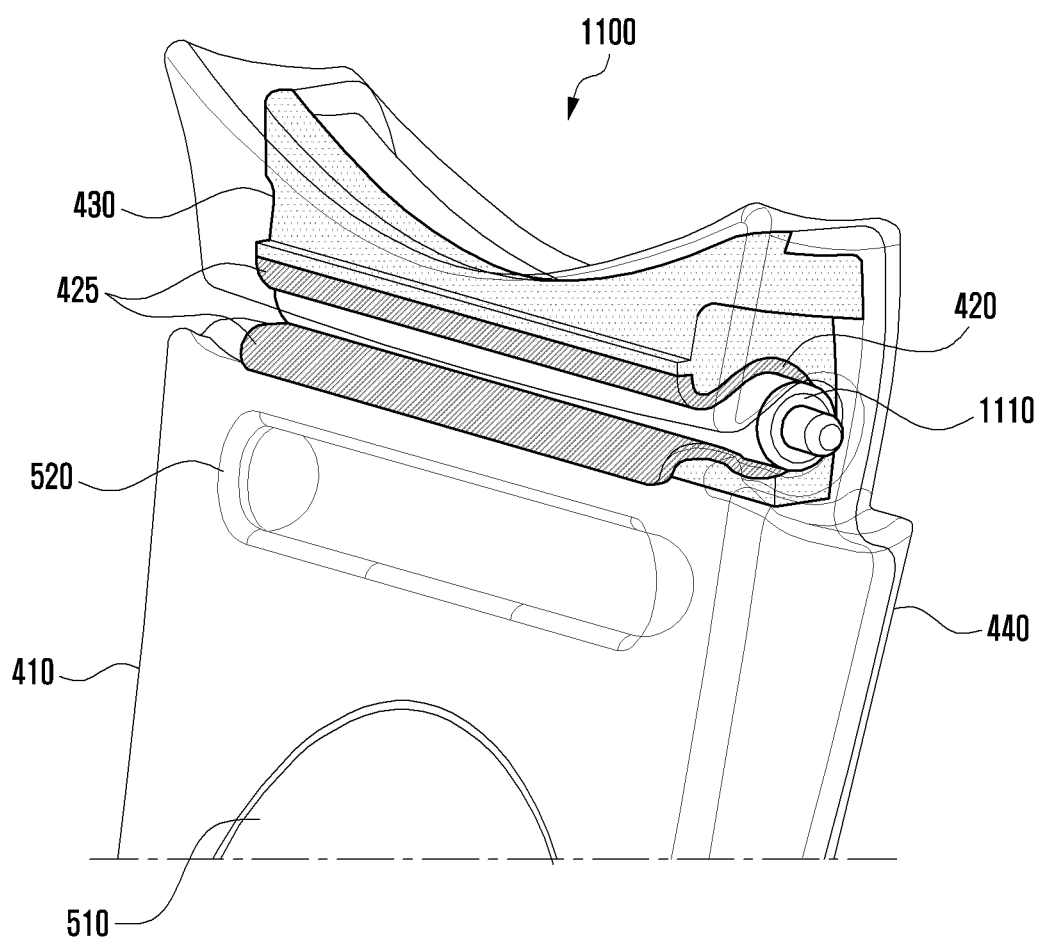
FIG. 6 is a schematically enlarged perspective view of a portion C illustrated in the strap in (B) of FIG. 5.
Figure 7:
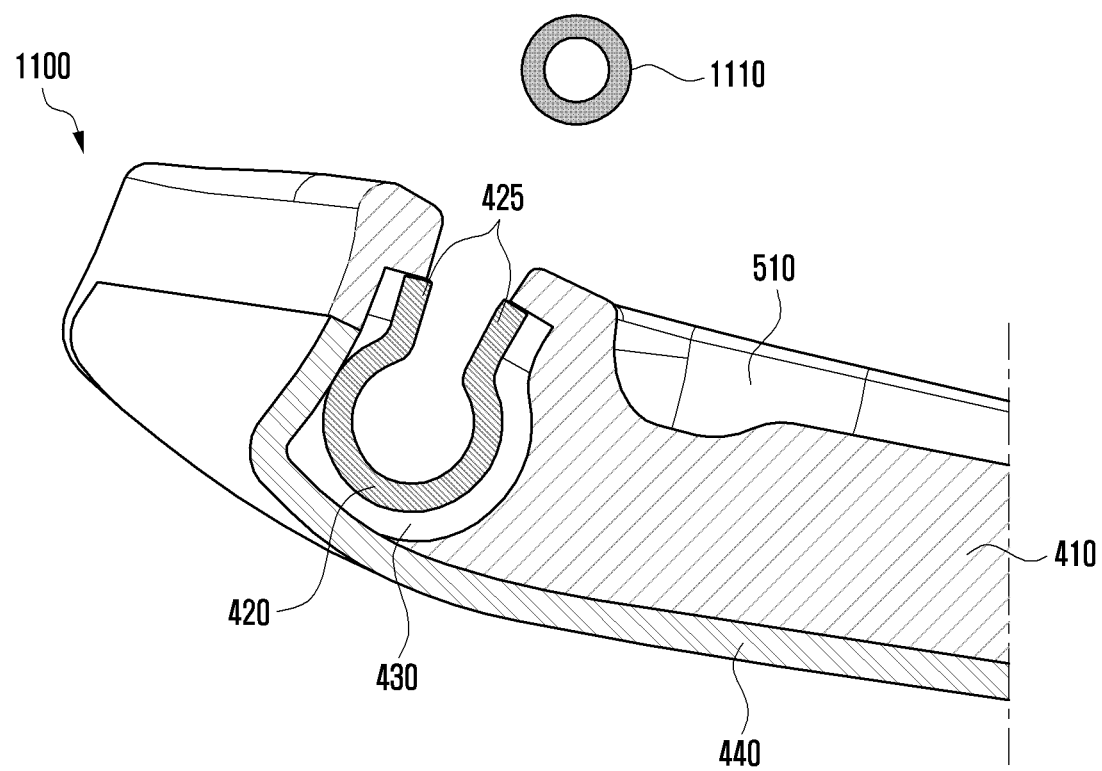
FIG. 7 is a diagram schematically illustrating a cross section of line d-d' illustrated in the strap in (B) of FIG. 5.

FIG. 5 is a diagram schematically illustrating a top surface and bottom surface of the strap according to certain embodiments of the disclosure. FIG. 6 is a schematically enlarged perspective view of a portion C illustrated in the strap in (B) of FIG. 5. FIG. 7 is a diagram schematically illustrating a cross section of line d-d' illustrated in the strap in (B) of FIG. 5.

In an embodiment, (A) of FIG. 5 may be a diagram viewed from a top (e.g., the z axis direction) of the strap 1100, in which the body member 410, the clip member 420, the insert member 430, and the outer cover member 440 disclosed in FIG. 4 are coupled. (B) of FIG. 5 may be a diagram viewed from a bottom (e.g., the −z axis direction) of the strap 1100 in which the body member 410, the clip member 420, the insert member 430, and the outer cover member 440 disclosed in FIG. 4 are combined. FIG. 7 may be a diagram schematically illustrating a cross-section of line d-d' in the state in which a second groove 520 has been omitted in the embodiment disclosed in (B) of FIG. 5.

With reference to (A) of FIG. 5, the outer cover member 440 of the strap 1100 (e.g., the first strap 250 or the second strap 260) may be attached to an outer surface of at least a part of the insert member 430 and an outer surface of the body member 410.

With reference to (B) of FIG. 5 and FIG. 6, the strap 1100 (e.g., the first strap 250 or the second strap 260) may include a first groove 510 and/or the second groove 520.

According to an embodiment, the first groove 510 may be formed in a part of one surface (e.g., the bottom surface in the −z axis direction) of the body member 410. The first groove 510 may be formed so as to extend, such that the strap 1100 may be smoothly bent when the strap 1100 is detachably combined with a part (e.g., a wrist) of the body of a user. The first groove 510 may be formed to have a given width and a given length, so that the strap 1100 may be smoothly bent.

According to an embodiment, the second groove 520 may be formed in a part of one surface (e.g., the bottom surface in the −z axis direction) of the body member 410. The second groove 520 may be formed between the first groove 510 and the clip member 420. The second groove 520 may provide a degree of flexibility so that distal ends 425 of the clip member 420, which open in a U shape, may be flexibly expanded, for example, when the clip member 420 is coupled with the first connection pin 1110. In another embodiment, the strap 1100 may be formed by using only the first groove 510 by omitting the second groove 520.

With reference to FIG. 7, in the strap 1100 (e.g., the first strap 250 or the second strap 260), the distal ends 425 of the clip member 420 formed substantially in a U shape, for example, may be formed to have a width greater than that of the body member 410, such that the ends 425 of the clip member 425 protrude beyond the edges of the body member 410. If the distal ends 425 of the clip member 420 are formed to more protrude beyond the edges of the body member 410, the first connection pin 1110 may be inserted into the clip member 420 without contacting a part of the body member 410. The distal ends 425 of the clip member 420 may be extended when the clip member 420 is inserted into a connection pin (e.g., the first connection pin 1110 or the second connection pin 1120), and may be contracted when the first connection pin 1110 is inserted and seated in the clip member 420.

Figure 8:
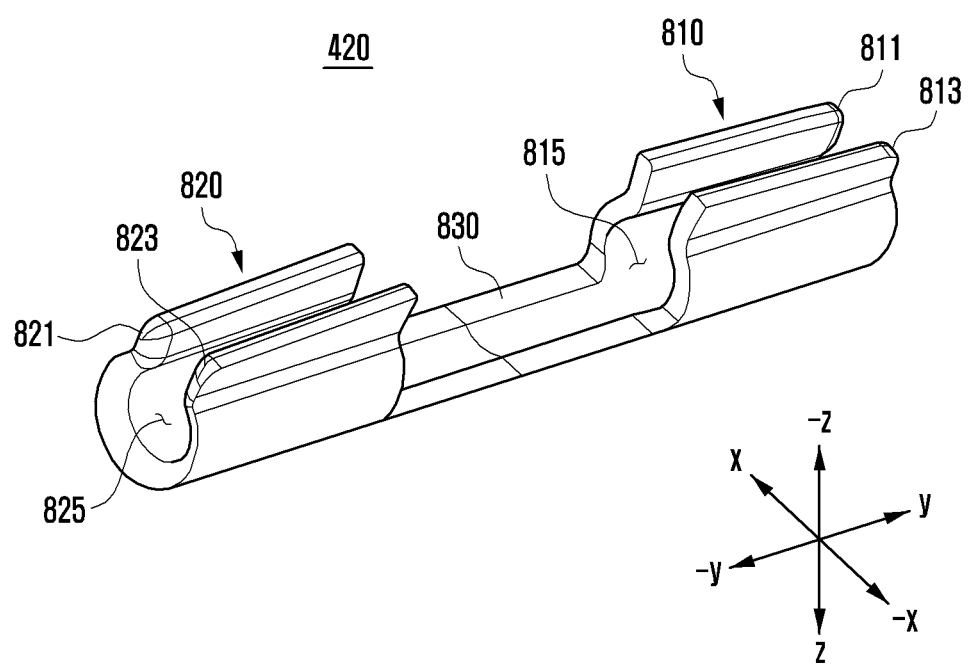
FIG. 8 is a diagram schematically illustrating an example a clip member of the wearable electronic device according to certain embodiments of the disclosure.

FIG. 8 is a diagram schematically illustrating an example the clip member of the wearable electronic device according to certain embodiments of the disclosure.

With reference to FIG. 8, the clip member 420 according to an embodiment of the disclosure may include a first catch part 810 disposed in one direction thereof (e.g., a y axis direction), a second catch part 820 disposed in another direction (e.g., a −y axis direction) opposite to the one direction (e.g., the y axis direction), and a support part 830 disposed between the first catch part 810 and the second catch part 820.

According to an embodiment, the first catch part 810 may include a first guide protrusion 811, a second guide protrusion 813, and a first catch groove 815. The first catch part 810 may be formed substantially in a U shape. The first guide protrusion 811 and the second guide protrusion 813 may form distal ends (e.g., the distal ends 425 in FIG. 6 or 7) of the first catch part 810. The first guide protrusion 811 and the second guide protrusion 813 may be isolated from each other, and may guide insertion of a part of a connection pin (e.g., the first connection pin 1110 or the second connection pin 1120) into (e.g., a z axis direction) the first catch groove 815. The first catch groove 815 may be seated therein and support a part of a connection pin (e.g., the first connection pin 1110 or the second connection pin 1120) guided between the first guide protrusion 811 and the second guide protrusion 813. The first guide protrusion 811 and the second guide protrusion 813 may extend when inserted into a connection pin (e.g., the first connection pin 1110 or the second connection pin 1120), and may contract to original positions when the connection pin (e.g., the first connection pin 1110 or the second connection pin 1120) is inserted and accommodated in the first catch groove 815.

According to an embodiment, the second catch part 820 may include a third guide protrusion 821, a fourth guide protrusion 823, and a second catch groove 825. The second catch part 820 may be formed substantially in a U shape. The third guide protrusion 821 and the fourth guide protrusion 823 may form distal ends (e.g., the distal ends 425 in FIG. 6 or 7) of the second catch part 820. The third guide protrusion 821 and the fourth guide protrusion 823 may be isolated from each other, and may guide insertion of a connection pin (e.g., the first connection pin 1110 or the second connection pin 1120) into (e.g., the z axis direction) the second catch groove 825. The second catch groove 825 may seat therein and support a part of a connection pin (e.g., the first connection pin 1110 or the second connection pin 1120) guided between the third guide protrusion 821 and the fourth guide protrusion 823. The third guide protrusion 821 and the fourth guide protrusion 823 may extend when during insertion into a connection pin (e.g., the first connection pin 1110 or the second connection pin 1120), and may contract to original positions when the connection pin (e.g., the first connection pin 1110 or the second connection pin 1120) is inserted into the second catch groove 825.

According to an embodiment, the support part 830 may integratedly connect the first catch part 810 and the second catch part 820. The support part 830 may support a part of a connection pin (e.g., the first connection pin 1110 or the second connection pin 1120) disposed in the first catch part 810 and the second catch part 820.

Figure 9:
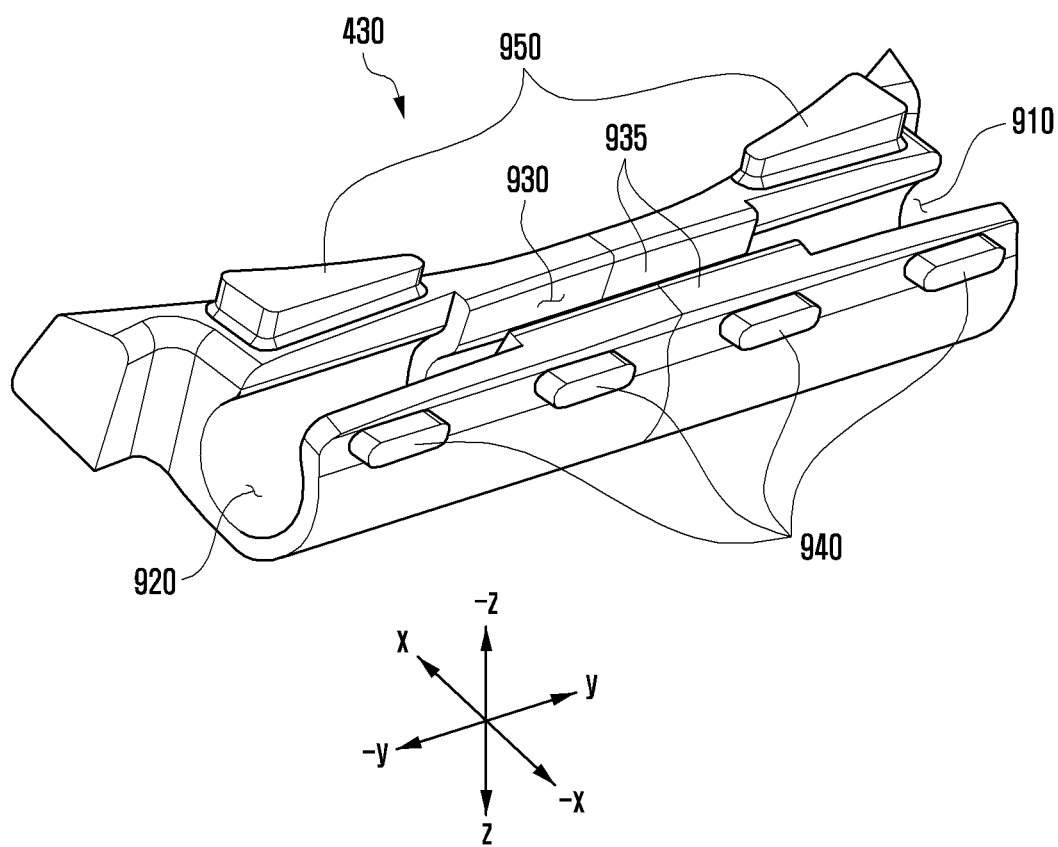
FIG. 9 is a diagram schematically illustrating an example an insert member of the wearable electronic device according to certain embodiments of the disclosure.

FIG. 9 is a diagram schematically illustrating an example the insert member of the wearable electronic device according to certain embodiments of the disclosure.

With reference to FIG. 9, the insert member 430 according to an embodiment of the disclosure may include a first accommodation part 910 formed in one direction (e.g., a y axis direction) thereof, a second accommodation part 920 formed in a direction (e.g., a −y axis direction) opposite to the one direction (e.g., the y axis direction), and a third accommodation part 930 formed between the first accommodation part 910 and the second accommodation part 920. The insert member 430 may be formed to include substantially a U shape.

According to an embodiment, the first accommodation part 910 may accommodate the first catch part 810, including the first guide protrusion 811, the second guide protrusion 813, and the first catch groove 815, and may support the first catch part 810 so that the first catch part 810 does not detach or fall away from the assembly.

According to an embodiment, the second accommodation part 920 may accommodate the second catch part 820, including the third guide protrusion 821, the fourth guide protrusion 823, and the second catch groove 825, and may support the second catch part 820 so that the second catch part 820 does not detach or fall away from the assembly.

According to an embodiment, the third accommodation part 930 may accommodate the support part 830, and may support the support part 830 so that the support part 830 is not detached to the outside. Support protrusions 935 supporting the support part 830 so that the support part 830 does not detach or fall away, after being accommodated in the third accommodation part 930 may be formed on both sides of the insert member 430 in accordance with the third accommodation part 930.

According to an embodiment, the insert member 430 may be implemented using a plastic material, for example, and may be disposed between the body member 410 and the clip member 420. The insert member 430 can prevent a force causing expansion of the first guide protrusion 811 and second guide protrusion 813 and third guide protrusion 821 and fourth guide protrusion 823 of the clip member 420 from being transmitted to the body member 410, which may be implemented using a silicon or fluoro elastomer material, when the clip member 420 implemented using a metal material is combined with a connection pin (e.g., the first connection pin 1110 or the second connection pin 1120), for example.

According to an embodiment, the insert member 430 may include a first convex part 940 and/or a second convex part 950. The first convex part 940 may be formed to protrude in one direction (e.g., a −x axis direction) on one side surface of the insert member 430. One or more first convex parts 940 may be formed. The second convex part 950 may be formed to protrude to a side surface (e.g., a −z axis direction, a bottom surface) different from the one side surface of the insert member 430. One or more second convex parts 950 may be formed.

According to an embodiment, the insert member 430 can increase a bonding force with the body member 410 by using the first convex part 940 and/or the second convex part 950.

Figure 10:
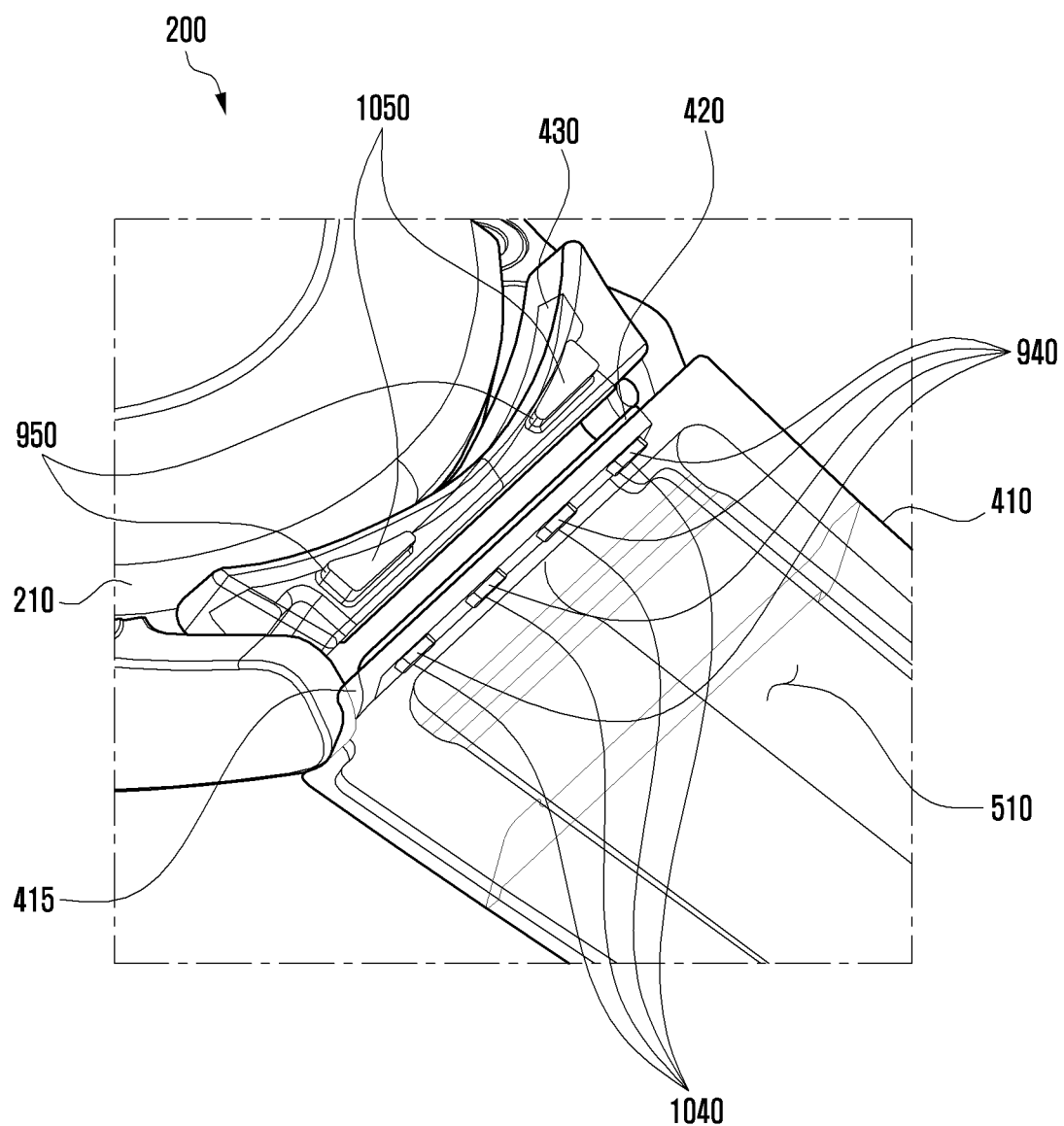
FIG. 10 is a diagram schematically illustrating a body member, insert member and clip member of the wearable electronic device according to certain embodiments of the disclosure are integratedly formed.

FIG. 10 is a diagram schematically illustrating a part of an assembly in which the body member, insert member and clip member of the wearable electronic device according to certain embodiments of the disclosure are integratedly formed.

With reference to FIG. 10, the clip member 420 of the wearable electronic device 200 according to certain embodiments of the disclosure may be accommodated in the insert member 430. The insert member 430 in which the clip member 420 is accommodated may itself be accommodated in the seated part 415 of the body member 410. The body member 410 may include a first concave part 1040 and/or a second concave part 1050.

According to an embodiment, the first concave part 1040 may be disposed at a location corresponding to the first convex part 940 of the insert member 430 disclosed in FIG. 9. The first concave part 1040 may be formed as a number corresponding to the first convex part 940. The second concave part 1050 may be formed at a location corresponding to the second convex part 950 of the insert member 430 disclosed in FIG. 9. The second concave part 1050 may be formed as a number corresponding to the second convex part 950. A bonding force between the insert member 430 and the body member 410 can be increased because the first convex part 940 and/or the second convex part 950 formed in the insert member 430 are combined with locations corresponding to the first concave part 1040 and/or the second concave part 1050 formed in the body member 410.

Figure 11:
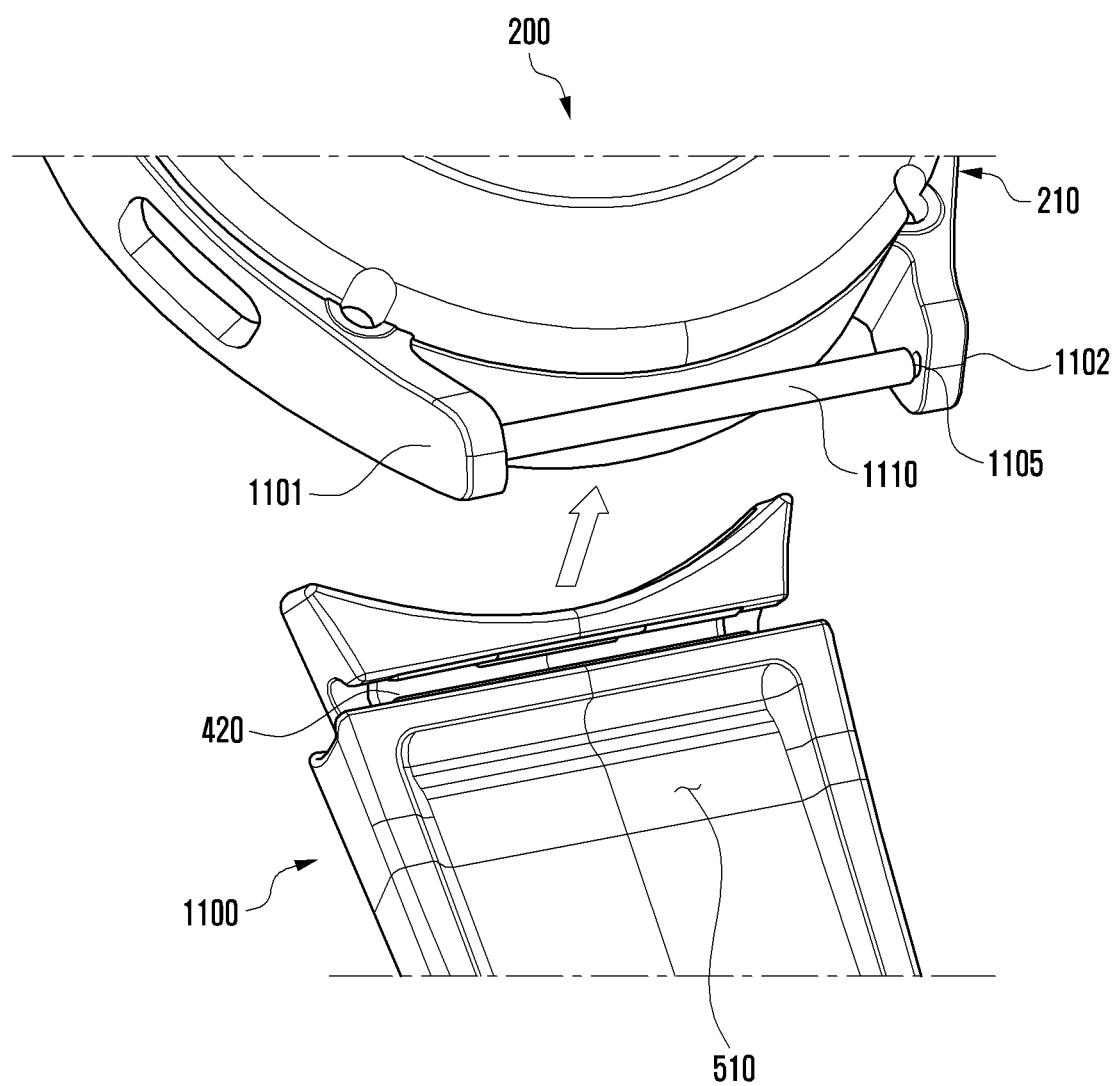
FIG. 11 is a diagram illustrating a part of a housing of the wearable electronic device and the strap according to certain embodiments of the disclosure are combined.
Figure 12:
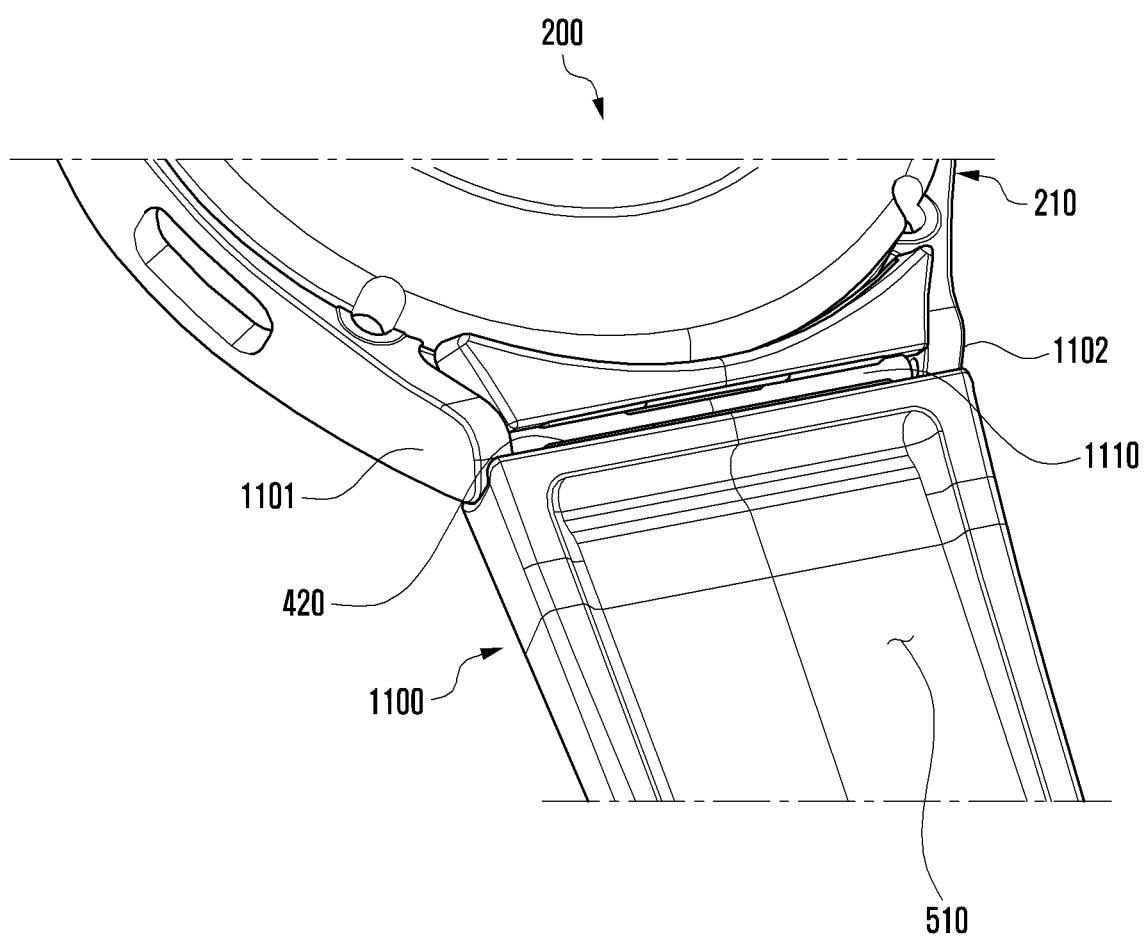
FIG. 12 is a diagram illustrating a part of an assembly in the state in which the housing and the strap in FIG. 11 are combined.

FIG. 11 is a diagram illustrating a part of an assembly before the housing of the wearable electronic device and the strap according to certain embodiments of the disclosure are combined. FIG. 12 is a diagram illustrating a part of an assembly in the state in which the housing and the strap in FIG. 11 are combined.

With reference to FIG. 11, in the wearable electronic device 200 according to certain embodiments of the disclosure, the first end and second end of the first connection pin 1110 may be inserted and combined with the combination grooves 1105 formed inside the first part 1101 and second part 1102 of the housing 210. The clip member 420 of the strap 1100 may be closely attached toward the first connection pin 1110, as indicated by an arrow in FIG. 11.

With reference to FIG. 12, the clip member 420 of the strap 1100 may be detachably combined with the first connection pin 1110. The strap 1100 may be rotatably combined with the first connection pin 1110.

Figure 13:
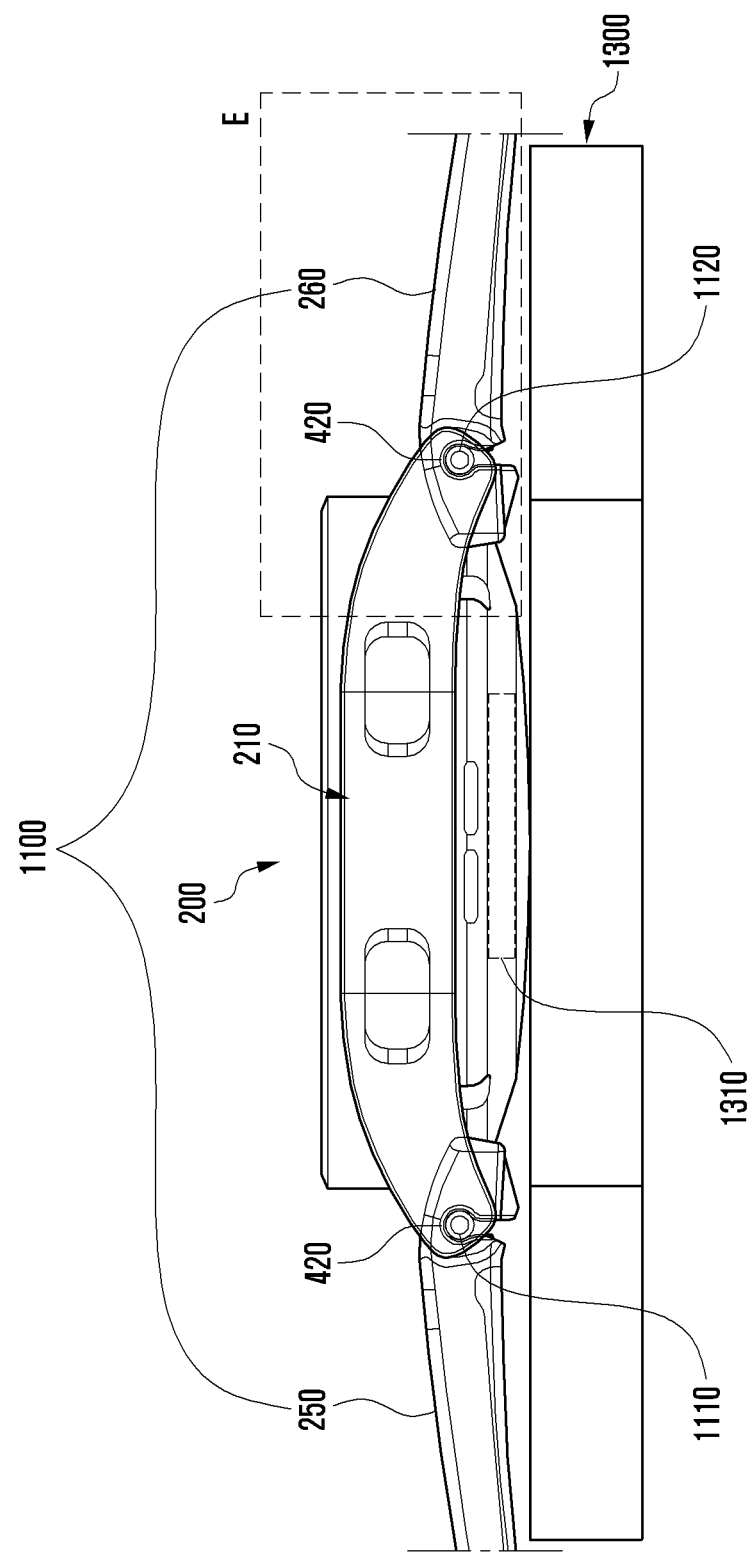
FIG. 13 is a diagram schematically illustrating an assembly in which the wearable electronic device according to certain embodiments of the disclosure is charged over a wireless charger.

FIG. 13 is a diagram schematically illustrating an assembly in which the wearable electronic device according to certain embodiments of the disclosure is charged over a wireless charger.

With reference to FIG. 13, in the wearable electronic device 200 according to certain embodiments of the disclosure, the strap 1100 (e.g., the first strap 250 and the second strap 260) may be rotatably combined with a connection pin (e.g., the first connection pin 1110 and the second connection pin 1120) by using the clip member 420. The strap 1100 (e.g., the first strap 250 and the second strap 260) may be horizontally unfolded with respect to the housing 210 as the clip member 420 is rotated through a connection pin (e.g., the first connection pin 1110 and the second connection pin 1120). A wireless charging part 1310 (e.g., the second antenna 355 in FIG. 3) disposed within the housing 210 may be closely attached to a wireless charger 1300 (e.g., a wireless charging pad) and may perform charging.

Figure 14:
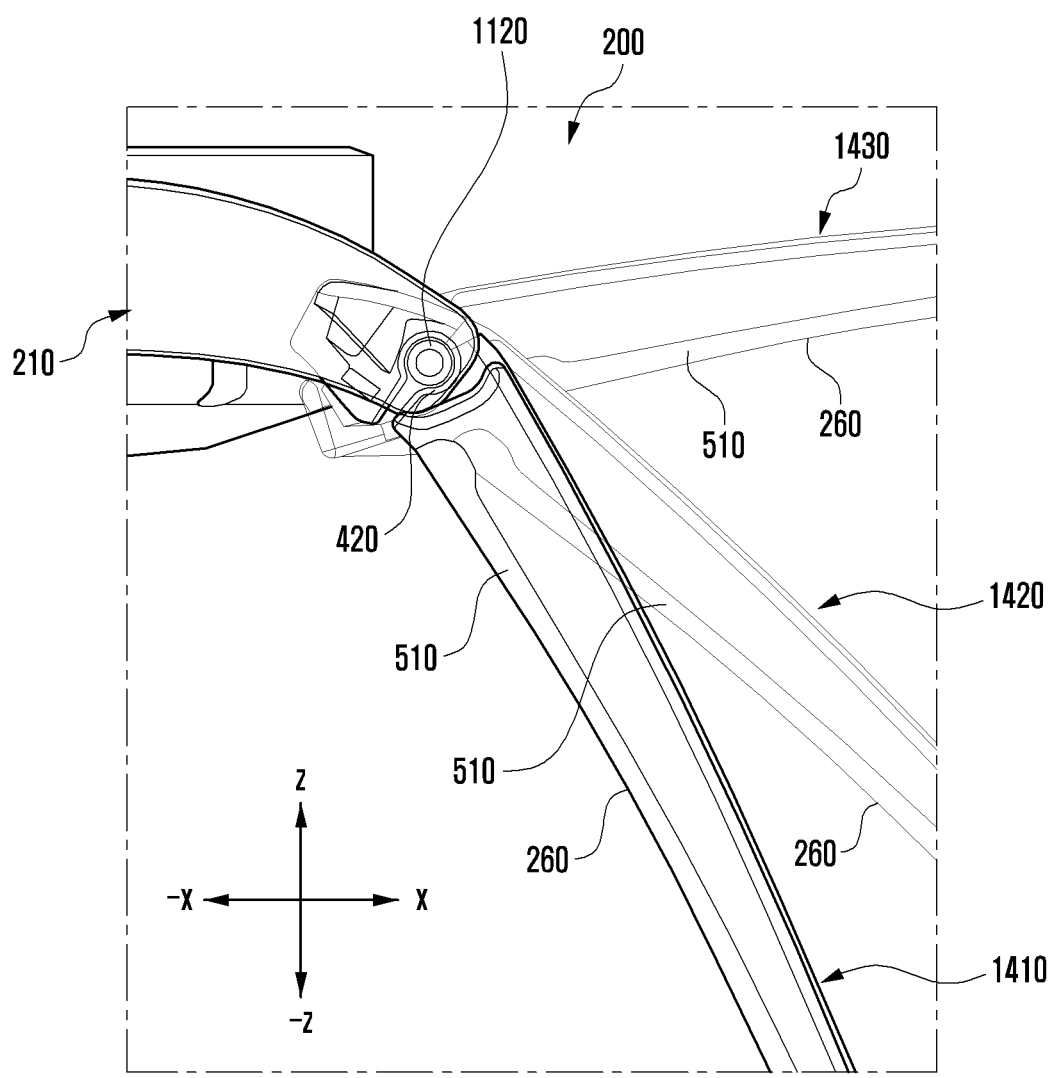
FIG. 14 is a diagram describing a bending angle of the strap for the housing of the wearable electronic device according to certain embodiments of the disclosure.

FIG. 14 is a diagram describing a bending angle of the strap for the housing of the wearable electronic device according to certain embodiments of the disclosure. In an embodiment, FIG. 14 may be an enlarged view schematically illustrating a portion E disclosed in FIG. 13.

With reference to FIG. 14, the wearable electronic device 200 according to certain embodiments of the disclosure may be rotatably combined with a connection pin (e.g., the second connection pin 1120) disposed in the housing 210 by using the clip member 420 of a strap (e.g., the second strap 260). The strap (e.g., the second strap 260) may be smoothly bent or unfolded by using the first groove 510 formed in the body member 410.

According to an embodiment, a first state 1410 is seen in which a strap (e.g., the second strap 260) is worn on a wrist of a user and bent in a −z axis direction. In the case of the first state 1410, the strap (e.g., the second strap 260) may be disposed substantially in the −z axis direction.

According to an embodiment, a second state 1420 is seen in which a strap (e.g., the second strap 260) has been partially unfolded with respect to the housing 210. In the case of the second state 1420, the strap (e.g., the second strap 260) may be disposed between the −z axis direction and an x axis direction.

According to an embodiment, a third state 1430 in seen in which charging is initiated, where a strap (e.g., the second strap 260) has been fully horizontally unfolded with respect to the housing 210. In the case of the third state 1430, the strap (e.g., the second strap 260) may be disposed in the x axis direction that is substantially horizontal to the housing 210.

Figure 15:
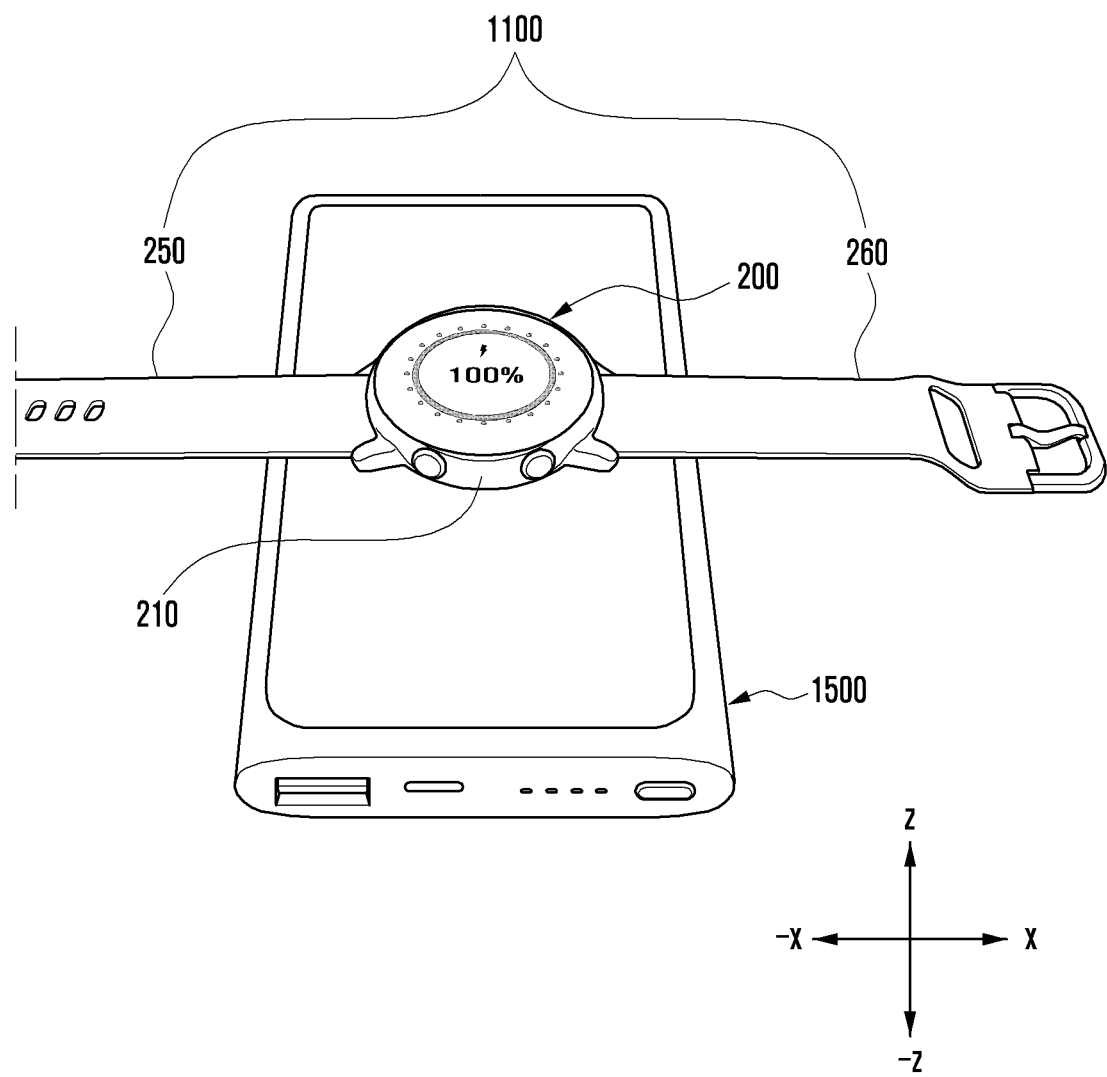
FIG. 15 is a diagram illustrating an embodiment in which the wearable electronic device according to certain embodiments of the disclosure is charged on another electronic device.

FIG. 15 is a diagram illustrating an embodiment in which the wearable electronic device according to certain embodiments of the disclosure is charged on another electronic device.

With reference to FIG. 15, the wearable electronic device 200 according to certain embodiments of the disclosure may be disposed on an electronic device 1500 (e.g., a smartphone), and may be in the process of charging (e.g., wireless charging). If the wearable electronic device 200 is charged using the electronic device 1500, the strap 1100 (e.g., the first strap 250 and the second strap 260) may be horizontally (e.g., an x axis direction and a −x axis direction) unfolded with respect to the housing 210. The housing 210 may perform charging by direct disposition on the electronic device 1500.

Figure 16:
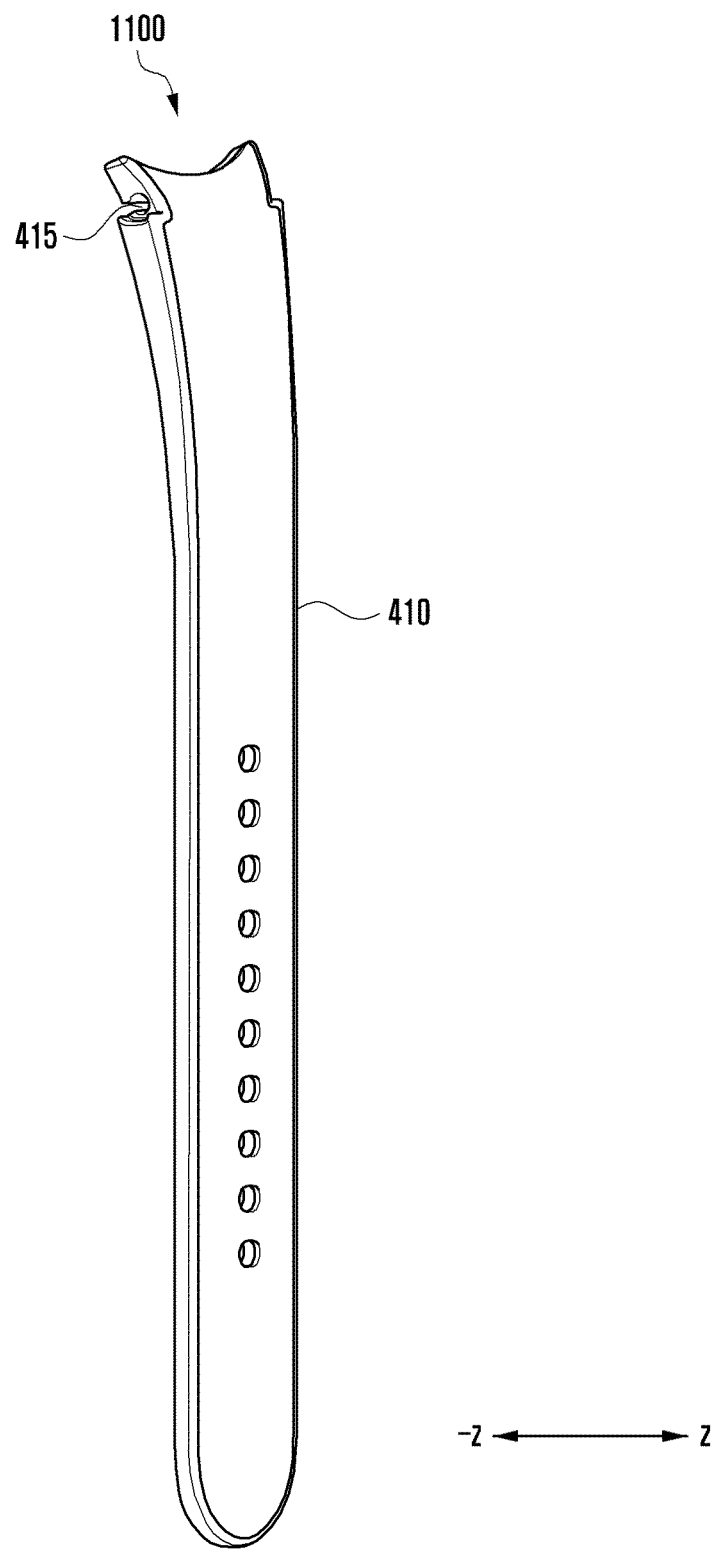
FIG. 16 is a diagram illustrating an embodiment in which the strap of the wearable electronic device according to certain embodiments of the disclosure includes a single material.

FIG. 16 is a diagram illustrating an embodiment in which the strap of the wearable electronic device according to certain embodiments of the disclosure includes a single material.

With reference to FIG. 16, the strap 1100 according to an embodiment of the disclosure may be implemented using a single material, such as silicon or fluoro-elastomers. For example, the body member 410 including the seated part 415 may be implemented using a single material (e.g., silicon or fluoro-elastomers), and may be used as the strap 1100.

Figure 17:
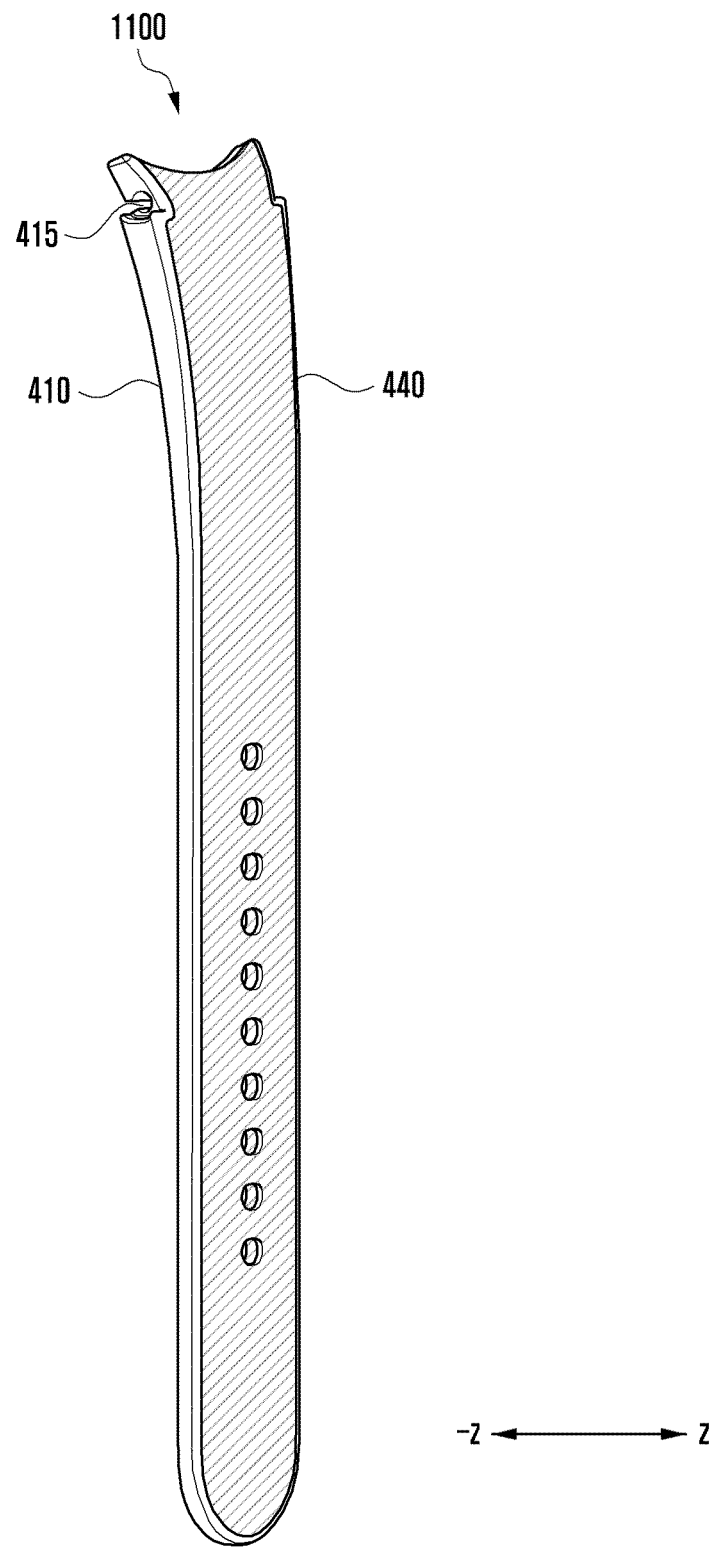
FIG. 17 is a diagram illustrating an embodiment in which the strap of the wearable electronic device according to certain embodiments of the disclosure includes a plurality of materials.

FIG. 17 is a diagram illustrating an embodiment in which the strap of the wearable electronic device according to certain embodiments of the disclosure includes a plurality of materials.

With reference to FIG. 17, the body member 410 and the outer cover member 440 may be combined to form the strap 1100 according to an embodiment of the disclosure.

According to an embodiment, the body member 410 may be implemented using a material, such as silicon or fluoro-elastomers. The outer cover member 440 may be implemented using a material, such as leather or fabric. The outer cover member 440 may be attached to one surface (e.g., a z axis direction) of the body member 410.

Figure 18:
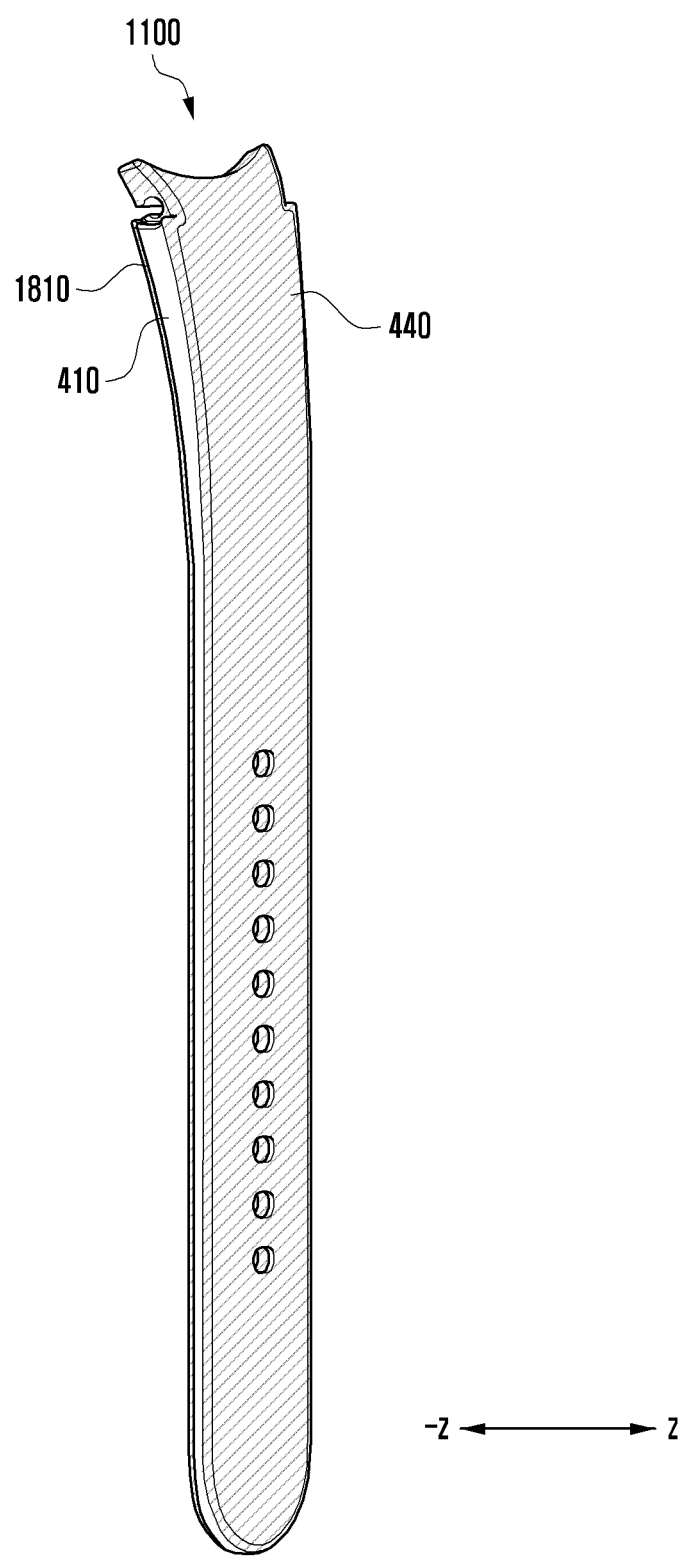
FIG. 18 is a diagram illustrating certain embodiments in which the strap of the wearable electronic device according to certain embodiments of the disclosure includes a plurality of materials.

FIG. 18 is a diagram illustrating certain embodiments in which the strap of the wearable electronic device according to certain embodiments of the disclosure includes a plurality of materials.

With reference to FIG. 18, the body member 410, the outer cover member 440, and an inner cover member 1810 may be combined to form the strap 1100 according to certain embodiments of the disclosure.

According to an embodiment, the body member 410 may be implemented using a material, such as silicon or fluoro-elastomers. The outer cover member 440 may be composed of a material, such as leather or fabric, and may be attached to a first surface (e.g., a z axis direction) of the body member 410. The inner cover member 1810 may be implemented using a material, such as leather or fabric, and may be attached to a second surface (e.g., the −z axis direction) of the body member 410.

Figure 19:
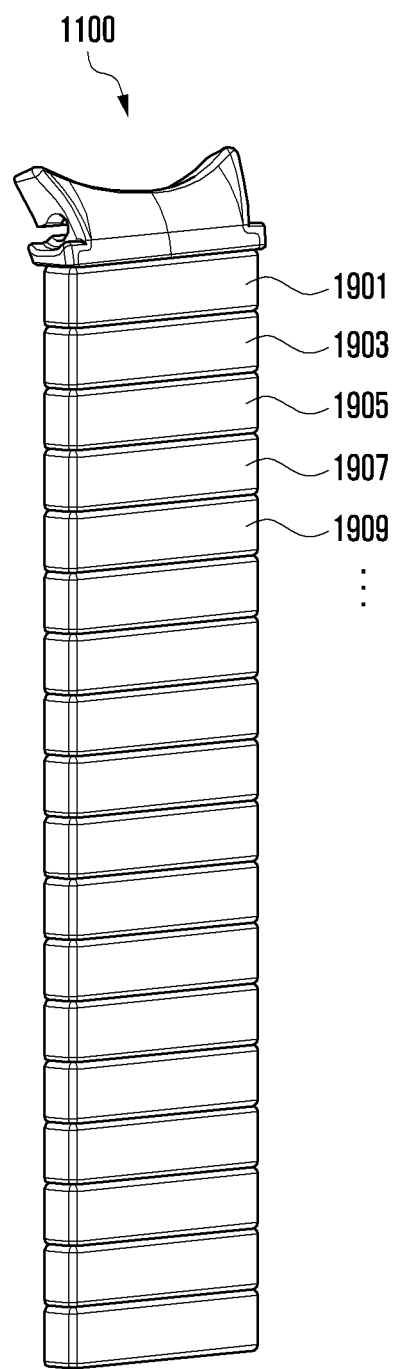
FIG. 19 is a diagram illustrating an embodiment in which the strap of the wearable electronic device according to certain embodiments of the disclosure is embodied in a metal link type.

FIG. 19 is a diagram illustrating an embodiment in which the strap of the wearable electronic device according to certain embodiments of the disclosure is embodied in a metal link type.

With reference to FIG. 19, at least one metal 1901, 1903, 1905, 1907, 1909, . . . etc., may be connected through a link (not illustrated) to form the strap 1100 according to certain embodiments of the disclosure.

Figure 20:
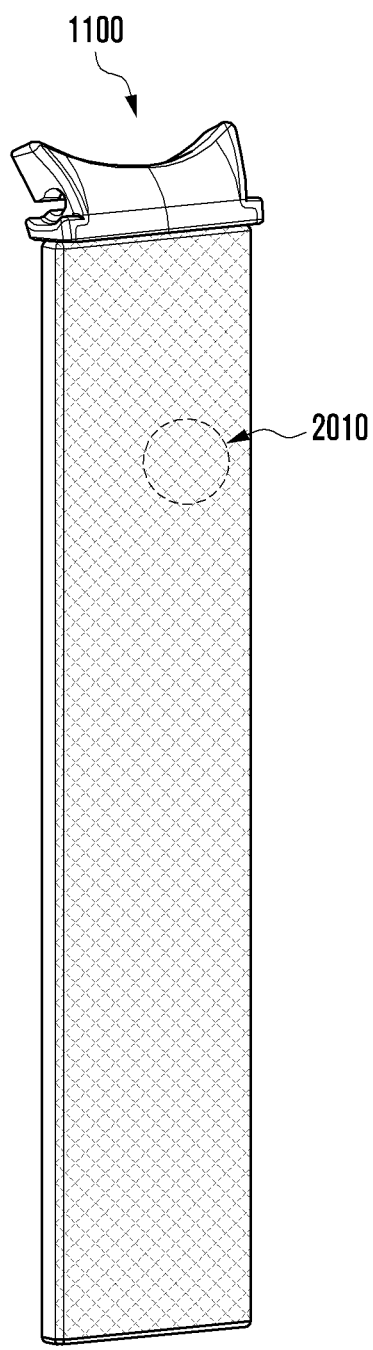
FIG. 20 is a diagram illustrating an embodiment in which the strap of the wearable electronic device according to certain embodiments of the disclosure is embodied in a mesh type.

FIG. 20 is a diagram illustrating an embodiment in which the strap of the wearable electronic device according to certain embodiments of the disclosure is formed as a mesh type strap.

With reference to FIG. 20, the inside of the strap 1100 according to certain embodiments of the disclosure may include metal having a grid pattern 2010, including at least one mesh.

The wearable electronic device 200 according to certain embodiments of the disclosure may include a housing 210 including the first connection pin 1110 disposed in a first direction and the second connection pin 1120 disposed in a second direction, that is, a direction opposite to the first direction, the first strap 250 detachably combined with the first connection pin 1110, and the second strap 260 detachably combined with the second connection pin 1120. The first strap 250 includes the body member 410 including the seated part 415 formed in one direction thereof, an insert member 430 combined within the seated part 415, and the clip member 420 combined within the insert member 430 and having one direction thereof opened. The clip member 420 may be rotatably combined with the first connection pin 1110.

According to certain embodiments, the first strap 250 and the second strap 260 may be formed in a way to be horizontally unfolded with respect to the housing 210.

According to certain embodiments, the body member 410, the insert member 430, and the clip member 420 may be integratedly formed by using insert injection.

According to certain embodiments, the first groove 510 may be formed in a part of an inner surface of the body member 410 so that the first strap 250 is smoothly bent.

According to certain embodiments, the second groove 520 may be formed between the first groove 510 and the clip member 420 in the part of the inner surface of the body member 410.

According to certain embodiments, the distal ends 425 of the clip member having the one direction thereof opened may be formed to more protrude to the outside than a part of the body member 410.

According to certain embodiments, the clip member 420 may include the first catch part 810 disposed in one direction thereof, the second catch part 820 disposed in a direction opposite to the one direction, and the support part 830 disposed between the first catch part 810 and the second catch part 820. The first catch part 810 may include the first guide protrusion 811 and the second guide protrusion 813 configured to guide a part of the first connection pin 1110 into the clip member 420, and a first catch groove 815 configured to accommodate the part of the first connection pin 1110 guided into the clip member 420 by using the first guide protrusion 811 and the second guide protrusion 813.

According to certain embodiments, the second catch part 820 may include the third guide protrusion 821 and the fourth guide protrusion 822 configured to guide the part of the first connection pin 1110 into the clip member 420, and the second catch groove 825 configured to accommodate the part of the first connection pin 1110 guided into the clip member 420 by using the third guide protrusion 821 and the fourth guide protrusion 823. The support part 830 may be formed to support the part of the first connection pin 1110 accommodated into the first catch part 810 and the second catch part 820.

According to certain embodiments, the insert member 430 may include the first accommodation part 910 accommodating the first catch part 810, the second accommodation part 920 accommodating the second catch part 820, and the third accommodation part 930 accommodating the support part 830.

According to certain embodiments, the insert member 430 may include the at least one first convex part 940 formed by protruding from one side surface thereof.

The body member 410 may include the at least one first concave part 1040 formed at a location corresponding to the at least one first convex part 940 and combined with the at least one first convex part 940.

According to certain embodiments, the housing 210 may include the wireless charging part 1310 disposed therein. The housing 210 may be formed to perform charging by being closely attached to the wireless charger 1300.

According to certain embodiments, the body member 410 may include of rubber, urethane, silicon or fluoro elastomers.

According to certain embodiments, the outer cover member 440 of leather or a fabric material may be attached to at least a part of an outer surface of the body member 410.

According to certain embodiments, the inner cover member 1810 of leather or a fabric material may be attached to at least a part of an inner surface of the body member 410.

According to certain embodiments, the insert member 430 may include a plastic material, and the clip member 420 may include a metal material.

The strap 1100 according to certain embodiments of the disclosure may include the body member 410 including the seated part 415 formed in one direction thereof, the insert member 430 combined within the seated part 415, and the clip member 420 combined within the insert member 430 and having one direction thereof opened.

According to certain embodiments, the body member 410, the insert member 430, and the clip member 420 may be integratedly formed by using insert injection.

According to certain embodiments, the first groove 510 may be formed in a part of the inner surface of the body member 410 so that the strap 1100 is smoothly bent.

According to certain embodiments, the outer cover member 440 of leather or fabric material may be attached to at least a part of the outer surface of the body member 410.

According to certain embodiments, the body member 410 may include one of rubber, urethane, silicon or fluoro elastomers. The insert member 430 may include a plastic material. The clip member 420 may include a metal material.

The disclosure has been described above based on certain embodiments of the disclosure, but may include changes and modifications by a person having ordinary knowledge in the art to which the disclosure pertains within a range not departing from the technical spirit of the disclosure.

What is claimed is:
1. A wearable electronic device, comprising:
 a housing, including a first connection pin detachably inserted in a first direction and a second connection pin detachably inserted in a second direction opposite to the first direction;

a first strap detachably affixed to the housing via the first connection pin; and a second strap detachably affixed to the housing via the second connection pin, wherein the first strap includes:

a body member having a groove formed at one end thereof and including a seated part in which an insert member is accommodated, a clip member coupled to the insert member, the clip member having distal ends formed outwardly defining an opening therein that extends lengthwise, wherein the groove provides flexibility so that the distal ends of the clip member flexibly expand when the clip member is rotatably coupled to the first connection pin.

2. The wearable electronic device of claim 1, wherein the first strap and the second strap are horizontally unfoldable with respect to the housing.

3. The wearable electronic device of claim 2, wherein:

the housing comprises a wireless charging part disposed therein, and the housing is configured to enable charging via attachment to a wireless charger via the wireless charging part.

4. The wearable electronic device of claim 1, wherein the body member, the insert member, and the clip member are formed using insert injection.

5. The wearable electronic device of claim 1, wherein another groove is formed in at least a part of an inner surface of the body member, causing the first strap to be smoothly bent.

6. The wearable electronic device of claim 5, wherein the groove is formed between the another groove and the clip member in the part of the inner surface of the body member.

7. The wearable electronic device of claim 1, wherein a width of the clip member is greater than a width of the body member at a corresponding portion of the body member, such that the clip member protrudes outwards beyond terminal edges of the body member.

8. The wearable electronic device of claim 1, wherein the clip member includes:

a first catch part, a second catch part oriented opposite to the first catch part, and a support part disposed between the first catch part and the second catch part, and wherein the first catch part comprises:

a first guide protrusion and a second guide protrusion configured to guide a part of the first connection pin into the clip member, and a first catch groove configured to accommodate the part of the first connection pin guided into the clip member via the first guide protrusion and the second guide protrusion.

9. The wearable electronic device of claim 8, wherein the second catch part includes:

a third guide protrusion and a fourth guide protrusion configured to guide the part of the first connection pin into the clip member; and a second catch groove configured to accommodate the part of the first connection pin guided into the clip member via the third guide protrusion and the fourth guide protrusion, wherein the support part is configured to support the part of the first connection pin accommodated into the first catch part and the second catch part.

10. The wearable electronic device of claim 8, wherein the insert member comprises:

a first accommodation part accommodating the first catch part, a second accommodation part accommodating the second catch part, and a third accommodation part accommodating the support part.

11. The wearable electronic device of claim 1, wherein:

the insert member includes at least one first convex portion that protrudes from one side surface thereof, and the body member includes at least one first concave part formed at a location corresponding to the at least one first convex portion.

12. The wearable electronic device of claim 1, wherein the body member includes one of rubber, urethane, silicon or fluoro-elastomers.

13. The wearable electronic device of claim 1, wherein an outer cover member including leather or a fabric material is attached to at least a part of an outer surface of the body member.

14. The wearable electronic device of claim 1, wherein an inner cover member including leather or a fabric material is attached to at least a part of an inner surface of the body member.

15. The wearable electronic device of claim 1, wherein:

the insert member includes a plastic material, and the clip member includes a metal material.

16. A strap comprising:

a body member having a groove formed at one end thereof and including a seated part;

an insert member accommodated within the seated part; and a clip member having a U shape coupled to the insert member, the clip member having distal ends formed outwardly defining an opening therein that extends lengthwise;

wherein the distal ends of the clip member flexibly expand when the clip member engages with a particular object.

17. The strap of claim 16, wherein the body member, the insert member, and the clip member are formed using insert injection.

18. The strap of claim 16, wherein a first groove is formed in at least a part of an inner surface of the body member, causing the first strap to be smoothly bent.

19. The strap of claim 16, wherein an outer cover member including leather or a fabric material is attached to at least a part of an outer surface of the body member.

20. The strap of claim 16, wherein:

the body member includes one of rubber, urethane, silicon or fluoro-elastomers, the insert member includes a plastic material, and the clip member includes a metal material.

* * * * *